United States Patent
Zhang et al.

(10) Patent No.: US 12,353,713 B2
(45) Date of Patent: Jul. 8, 2025

(54) MEMORY CONTROLLER WITH COMMON REQUEST BUFFER

(71) Applicant: Western Digital Technologies, Inc., San Jose, CA (US)

(72) Inventors: Lunkai Zhang, Portland, OR (US); Rasmus Madsen, Copenhagen (DK); Martin Lueker-Boden, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 153 days.

(21) Appl. No.: 18/360,535

(22) Filed: Jul. 27, 2023

(65) Prior Publication Data

US 2024/0302964 A1    Sep. 12, 2024

Related U.S. Application Data

(60) Provisional application No. 63/489,615, filed on Mar. 10, 2023.

(51) Int. Cl.
G06F 12/00    (2006.01)
G06F 3/06    (2006.01)

(52) U.S. Cl.
CPC ............ G06F 3/061 (2013.01); G06F 3/0656 (2013.01); G06F 3/0673 (2013.01)

(58) Field of Classification Search
CPC ....... G06F 3/061; G06F 3/0659; G06F 3/0673
USPC .......................................................... 711/154
See application file for complete search history.

(56) References Cited

U.S. PATENT DOCUMENTS

| | | | |
|---|---|---|---|
| 8,938,656 B2 | 1/2015 | Liu | |
| 9,552,175 B2* | 1/2017 | Takefman | ............... G06F 21/71 |
| 9,904,489 B2 | 2/2018 | Jeddeloh | |
| 9,904,619 B2 | 2/2018 | Shiota et al. | |
| 10,250,281 B2 | 4/2019 | Achtenberg et al. | |
| 10,990,537 B1* | 4/2021 | Moertl | ............... G11C 29/4401 |
| 11,048,644 B1* | 6/2021 | Volpe | .................. G06F 12/1072 |
| 2002/0083244 A1* | 6/2002 | Hammarlund | ...... G06F 12/0857 711/E12.05 |
| 2007/0260828 A1* | 11/2007 | Swaminathan | ..... G06F 13/4234 711/154 |
| 2009/0259789 A1* | 10/2009 | Kato | ....................... G06F 13/28 710/308 |
| 2010/0077175 A1* | 3/2010 | Wu | ....................... G06F 3/0659 711/E12.001 |
| 2013/0103903 A1* | 4/2013 | Rajagopalan | ....... G06F 12/0895 711/E12.017 |
| 2015/0012713 A1* | 1/2015 | Flanders | ............. G06F 12/0831 711/146 |
| 2016/0359973 A1* | 12/2016 | Loh | ......................... G06F 3/067 |
| 2021/0367777 A1* | 11/2021 | Benisty | .................... G06F 21/85 |

(Continued)

*Primary Examiner* — Mohamed M Gebril
(74) *Attorney, Agent, or Firm* — Pearl Cohen Zedek Latzer Baratz LLP

(57) ABSTRACT

A control circuit for a non-volatile memory array includes an interface to receive requests, a common request queue connected to the interface and a common request buffer connected to the common request queue. The common request buffer is configured to receive the requests from the common request queue in their received order and buffer unfinished requests directed to memory addresses such that for any address in the non-volatile memory array no more than one unfinished request is in the common request buffer.

19 Claims, 18 Drawing Sheets

(56) References Cited

U.S. PATENT DOCUMENTS

| | | | |
|---|---|---|---|
| 2023/0187413 A1* | 6/2023 | Yoshihara | H10B 51/20 257/777 |
| 2023/0195314 A1* | 6/2023 | Yoshihara | G11C 16/08 711/154 |
| 2024/0302964 A1* | 9/2024 | Zhang | G06F 3/0656 |

* cited by examiner

| | Request Type | Data State | Command (CMD) | Command State | Address | Data |
|---|---|---|---|---|---|---|
| Step 1 | Invalid | Dirty | Write | Await-Scheduling | A | #AAAA |
| Step 2 | Invalid | Clean | Invalid | Invalid | A | #AAAA |

| | Request Type 1058 | Data State 1060 | Command (CMD) 1062 | Command State 1064 | Address 1054 | Data 1056 |
|---|---|---|---|---|---|---|
| Step 1 | Read | Invalid | Fast Read | Await-Scheduling → In Process | A | Invalid |
| Step 2 | Invalid | Invalid | Invalid | Invalid | A | Invalid |

| | Request Type | Data State | Command (CMD) | Command State | Address | Data |
|---|---|---|---|---|---|---|
| Step 1 | Read | Invalid | Fast Read | Await-Scheduling → In Process | A | Invalid |
| Step 2 | Read | Invalid | Extended Read | Await-Scheduling → In Process | A | Invalid |
| Step 3 | Invalid | Dirty | Write | Await-Scheduling | A | #AAAA* |
| Step 4 | Invalid | Clean | Invalid | Invalid | A | #AAAA* |

| | Request Type | Data State | Command (CMD) | Command State | Address | Data |
|---|---|---|---|---|---|---|
| Step 1 | Refresh | Invalid | Fast Read | Await-Scheduling → In Process | A | Invalid |
| Step 2 | Invalid | Dirty | Write | Await-Scheduling | A | #AAAA* |
| Step 3 | Invalid | Clean | Invalid | Invalid | A | #AAAA* |

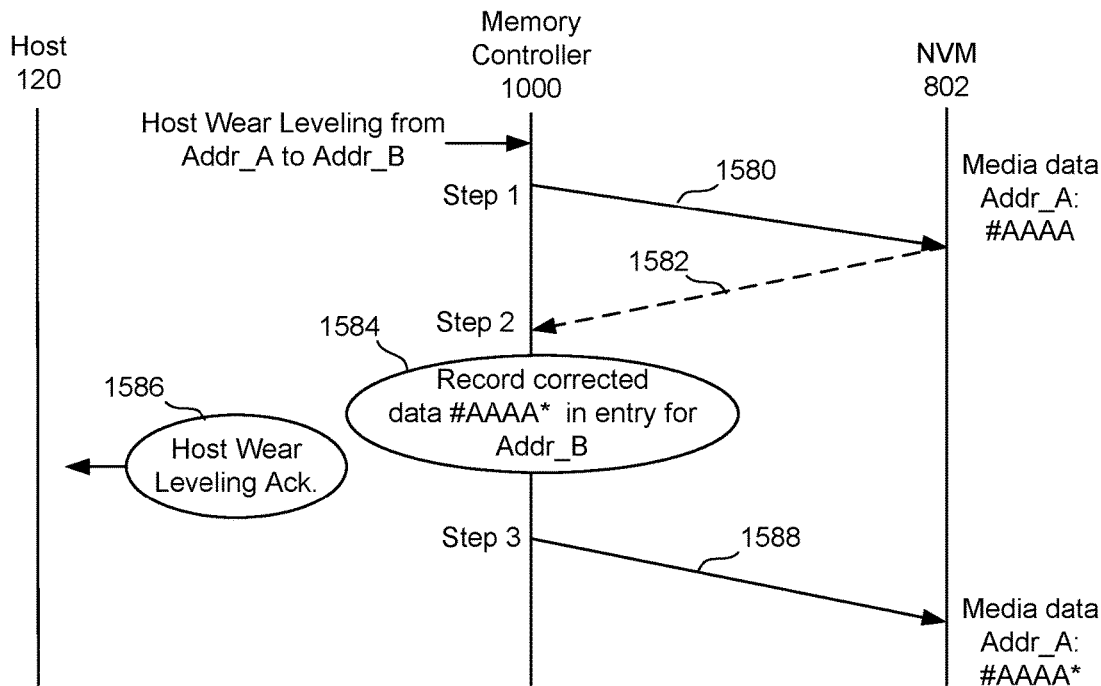

FIG. 15A

| | | Request Type 1058 | Data State 1060 | Command (CMD) 1062 | Command State 1064 | Address 1054 | Data 1056 |
|---|---|---|---|---|---|---|---|
| Step 1 | Addr_A | WLM | Invalid | Fast Read | Await-Scheduling → In Process | A | Invalid |
| | Addr_B | Invalid | Waiting-For-Data | Invalid | Invalid | B | Invalid |
| Step 2 | Addr_A | Invalid | Invalid | Invalid | Invalid | A | Invalid |
| | Addr_B | Invalid | Dirty | Write | Await-Scheduling | B | #AAAA* |
| Step 3 | Addr_A | Invalid | Invalid | Invalid | Invalid | A | Invalid |
| | Addr_B | Invalid | Clean | Invalid | Invalid | B | #AAAA* |

FIG. 15B

MEMORY CONTROLLER WITH COMMON REQUEST BUFFER

CLAIM OF PRIORITY

The present application claims priority from U.S. Provisional Patent Application No. 63/489,615, entitled "MEMORY CONTROLLER WITH COMMON REQUEST BUFFER," by Zhang et al., filed Mar. 10, 2023, incorporated by reference herein in its entirety.

BACKGROUND

Memory is widely used in various electronic devices such as cellular telephones, digital cameras, personal digital assistants, medical electronics, mobile computing devices, non-mobile computing devices, and data servers. Memory may comprise non-volatile memory or volatile memory. A non-volatile memory allows information to be stored and retained even when the non-volatile memory is not connected to a source of power (e.g., a battery). While volatile memory (e.g., Dynamic Random Access Memory or DRAM) has generally been used for certain applications with low latency and high throughput requirements, some types of non-volatile memories (sometimes referred to as "emerging memory" or "storage class memory") may be configured to meet such requirements and may also be used.

Non-volatile memory cells may reside in a cross-point non-volatile memory array. In a non-volatile memory array with a cross-point type architecture, a first set of conductive lines run across the surface of a substrate and a second set of conductive lines are formed over the first set of conductive lines, running over the substrate in a direction perpendicular to the first set of conductive lines. The memory cells are located at the cross-point junctions of the two sets of conductive lines.

A reversible resistivity memory cell is formed from a material having a programmable resistance. In a binary approach, the memory cell at each cross-point can be programmed into one of two resistance states: high and low. In some approaches, more than two resistance states may be used. One type of reversible resistivity memory cell is a magnetoresistive random access memory (MRAM) cell. An MRAM cell uses magnetization to represent stored data, in contrast to some other memory technologies that use electronic charges to store data. A bit of data is written to an MRAM cell by changing the direction of magnetization of a magnetic element ("the free layer") within the MRAM cell, and a bit is read by measuring the resistance of the MRAM cell (low resistance typically represents a "0" bit and high resistance typically represents a "1" bit).

MRAM and other types of non-volatile memory are sometimes used in demanding situations (e.g., with strict bandwidth and latency requirements) where volatile memory (e.g., DRAM) may have been more commonly used. Requirements of non-volatile memories may be very different from volatile memory so that control circuits that are optimized for volatile memory may not be suitable for non-volatile memory.

BRIEF DESCRIPTION OF THE DRAWING

Like-numbered elements refer to common components in the different figures.

FIGS. 15A-B illustrate an example of a memory controller with a common request buffer handling a host wear leveling request.

DETAILED DESCRIPTION

Figure 1:
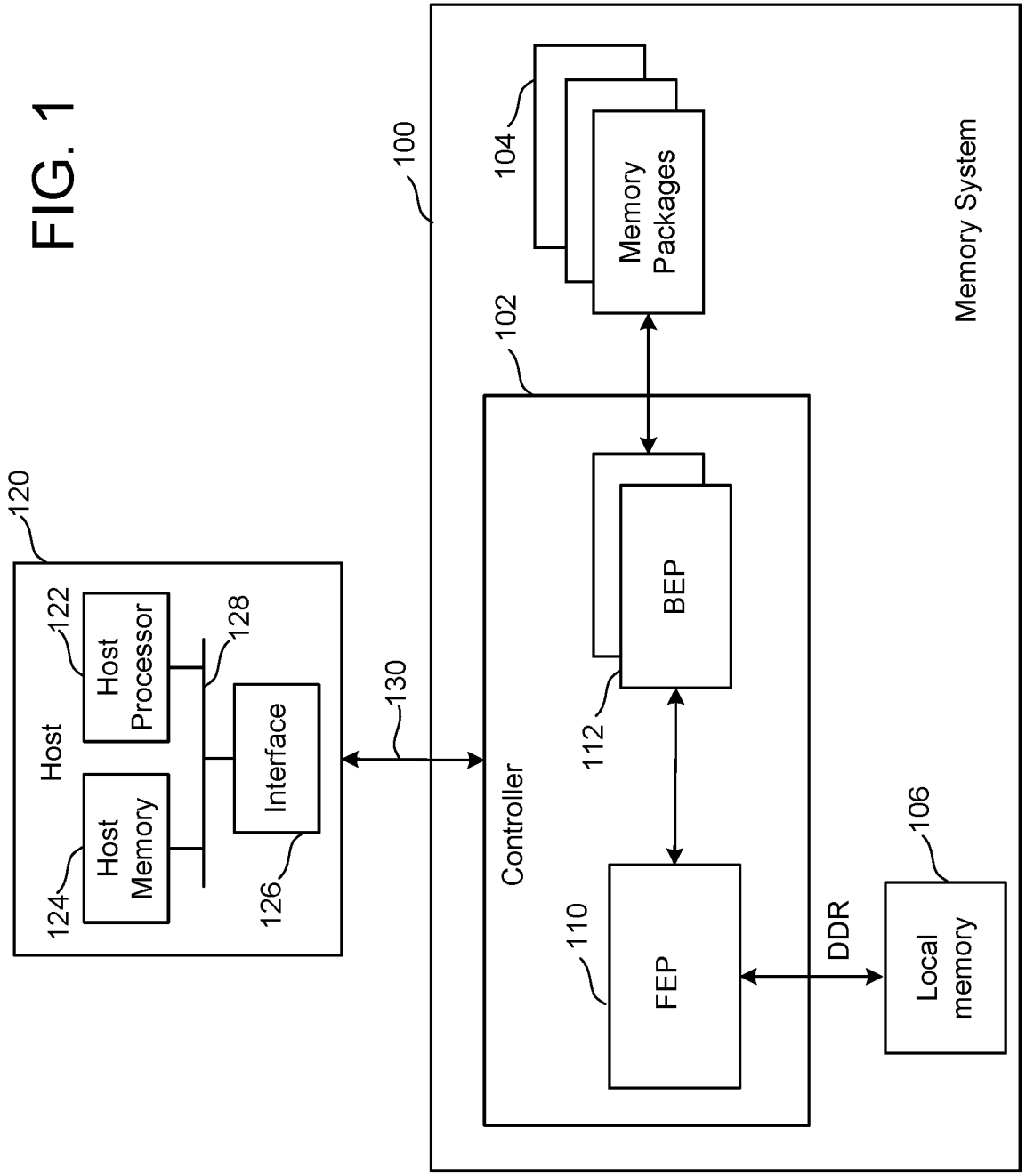
FIG. 1 is a block diagram of one embodiment of a non-volatile memory system connected to a host.

Technology is disclosed herein for control circuits that interface with non-volatile memory (e.g., emerging memory such as MRAM) to efficiently achieve high throughput and low latency in a manner that is adapted to the characteristics of the non-volatile memory. Control circuits may be configured to receive requests, including host requests (e.g., host read requests and host write requests) and media management requests, from a host and front-end components and may place the requests in a common request queue. A common request buffer is connected to the common request queue and requests are moved from the common request queue to the common request buffer by creating corresponding entries in the common request buffer that include information about the request and the status of any memory commands and data associated with the request. Entries are maintained at least until the request is finished and may be deleted or overwritten in order to make space available in the common request buffer.

Entries in the common request buffer may be limited to one per address. Prior to creating an entry in the common request buffer for a new request (e.g., the next request in the common request queue), the address of the new request may be compared with addresses of unfinished entries in the common request buffer. If no match is found, the new request may be taken from the common request queue and a corresponding entry generated in the common request buffer. If a match is found (e.g., there is an entry in the common request buffer for a corresponding unfinished request with the same address as the new request) then the new request may be maintained in the common request queue and no new entry may be generated in the common request buffer until the entry in the common request buffer indicates that the prior request is finished. This arrangement may efficiently avoid conflict between requests.

In some embodiments, the non-volatile memory cells are in a cross-point array and are magnetoresistive random access memory (MRAM) cells. An MRAM cell uses magnetization to represent stored data, in contrast to some other memory technologies that use electronic charges to store data. A bit of data is written to an MRAM cell by changing the direction of magnetization of a magnetic element ("the free layer") within the MRAM cell, and a bit is read by measuring the resistance of the MRAM cell (low resistance typically represents a "0" bit and high resistance typically represents a "1" bit). As used herein, direction of magnetization is the direction that the magnetic moment is oriented with respect to a reference direction set by another element of the MRAM ("the reference layer"). In some embodiments, the low resistance is referred to as a parallel or P-state and the high resistance is referred to as an anti-parallel or AP-state. MRAM can use the spin-transfer torque effect to change the direction of the magnetization from P-state to AP-state and vice-versa, which typically requires bipolar (bi-directional write) operation for writes. In other embodiments, the non-volatile memory cells may be Phase Change Memory (PCM) cells, Resistive Random Access Memory (ReRAM) cells or other suitable non-volatile memory cells.

FIG. 1 is a block diagram of one embodiment of a non-volatile memory system (or more briefly "memory system") 100 connected to a host system 120. Memory system 100 can implement the technology presented herein for a mixed current-force read scheme. Many different types of memory systems can be used with the technology proposed herein. Example memory systems include dual in-line memory modules (DIMMs), solid state drives ("SSDs"), memory cards and embedded memory devices; however, other types of memory systems can also be used.

Memory system 100 of FIG. 1 comprises a memory controller 102, non-volatile memory 104 for storing data, and local memory 106 (e.g., MRAM, PCM, ReRAM, DRAM). In one embodiment, memory controller 102 provides access to memory cells in a cross-point array in local memory 106 and/or non-volatile memory 104. For example, memory controller 102 may provide for access in a cross-point array of MRAM cells in local memory 106. In another embodiment the memory controller 102 or interface 126 or both are eliminated, and the memory packages are connected directly to the Host 120 through a bus such as DDRn. The local memory 106 may be referred to as a memory system. The combination of the memory controller 102 and local memory 106 and/or non-volatile memory may be referred to herein as a memory system.

Memory controller 102 comprises a Front-End Processor (FEP) circuit 110 and one or more Back-End Processor (BEP) circuits 112. In one embodiment FEP circuit 110 is implemented on an ASIC. In one embodiment, each BEP circuit 112 is implemented on a separate ASIC. In other embodiments, a unified controller ASIC can combine both the front-end and back-end functions. In another embodiment, the FEP and BEP are eliminated in favor of direction control by the Host 120 and any functions required of the memory are generated on the memory chip, such as ECC and wear leveling.

The ASICs for each of the BEP circuits 112 and the FEP circuit 110 may be implemented on the same semiconductor such that the memory controller 102 is manufactured as a System on a Chip ("SoC"). Alternatively, such circuitry can be placed on each memory chip avoiding the overhead space and expense of adding an external controller and/or BEP or FEP. FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Media Management Layer (MML) that performs memory management (e.g., garbage collection, wear leveling, etc.), logical to physical address translation, communication with the host, management of local memory 106 and management of the overall operation of the SSD (or other non-volatile storage system). The BEP circuit 112 manages memory operations in the memory packages/die at the request of FEP circuit 110. For example, the BEP circuit 112 can carry out the read, erase, and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, memory controller 102 is connected to one or more non-volatile memory die. In one embodiment, the memory package may include Flash memory such as NAND flash memory. In one embodiment, the memory package can include types of memory, such as "storage class memory (SCM)" or "emerging memory" based on resistive random access memory (such as ReRAM, MRAM, FeRAM or a phase change memory PCM). In one embodiment, memory controller 102 provides access to memory cells in a cross-point array in a memory package 104.

Memory controller 102 communicates with host system 120 via an interface 130 that implements a protocol such as, for example, Compute Express Link (CXL). Or such a controller can be eliminated, and the memory packages can be placed directly on the host bus, DDRn for example. For working with memory system 100, host system 120 includes a host processor 122, host memory 124, and interface 126 connected along bus 128. Host memory 124 is the host's physical memory, and can be DRAM, SRAM, ReRAM, PCM, MRAM, non-volatile memory, or another type of storage. In an embodiment, host memory 124 contains a cross-point array of non-volatile memory cells, with each memory cell comprising a resistive random access memory element and a two terminal selector element in series with the memory element.

Host system 120 is external to and separate from memory system 100. In one embodiment, memory system 100 is embedded in host system 120. Host memory 124 may be referred to herein as a memory system. The combination of the host processor 122 and host memory 124 may be referred to herein as a memory system. In an embodiment, such host memory can be cross-point memory using MRAM, ReRAM, PCM or other non-volatile memory.

Figure 2:
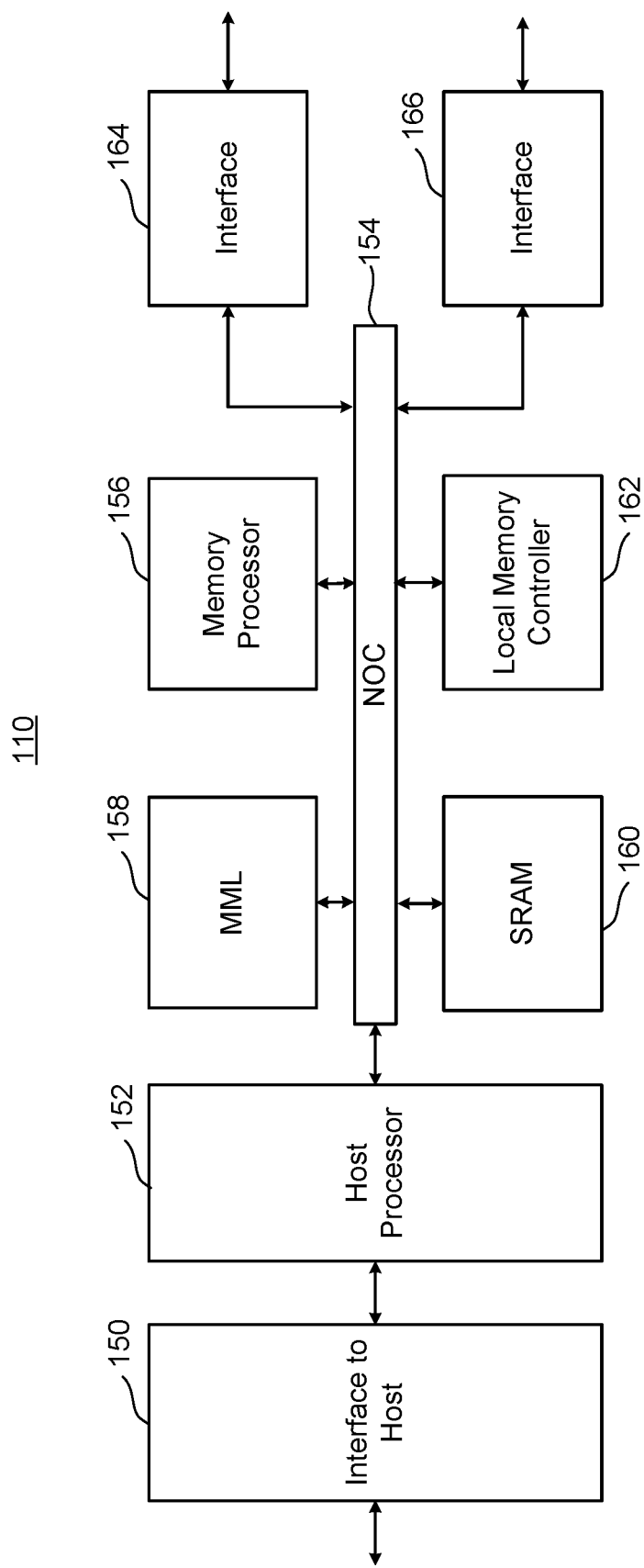
FIG. 2 is a block diagram of one embodiment of a Front-End Processor Circuit. In some embodiments, the Front-End Processor Circuit is part of a memory controller.

FIG. 2 is a block diagram of one embodiment of FEP circuit 110. FIG. 2 shows an interface 150 to communicate with host system 120 and a host processor 152 in communication with that interface. Interface 150 may be CXL, DDR, or PCIe, for example. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a local memory controller 162. The local memory controller 162 is used to operate and communicate with the local memory 106 (e.g., local memory 106 in FIG. 1). In one embodiment, local memory controller 162 is an MRAM controller to operate and communicate with MRAM in local memory 106. In other embodiments, local memory controller 162 is a ReRAM controller or PCM controller to operate and communicate with local memory 106. SRAM 160 is local RAM memory used by memory processor 156. Memory processor 156 is used to run the FEP circuit and perform the various memory operations. Also, in communication with the NOC are two Interfaces 164 and 166, which may be CXL, DDR, or PCIe, for example. In the embodiment of FIG. 2, the SSD controller will include two BEP circuits 112; therefore, there are two Interfaces 164/166. Each Interface 164/166 communicates with one of the BEP circuits 112. In other embodiments, there can be more or less than two BEP circuits 112; therefore, there can be more than two Interfaces 164/166.

FEP circuit 110 can also include a Media Management Layer (MML) 158 that performs memory management (e.g., garbage collection, wear leveling, load balancing, etc.), logical to physical address translation, communication with the host, management of DRAM (local volatile memory, if provided) and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management. In particular, the MML 158 may include an algorithm in the memory device firmware which translates writes from the host into writes to the memory structure of a die.

Figure 3:
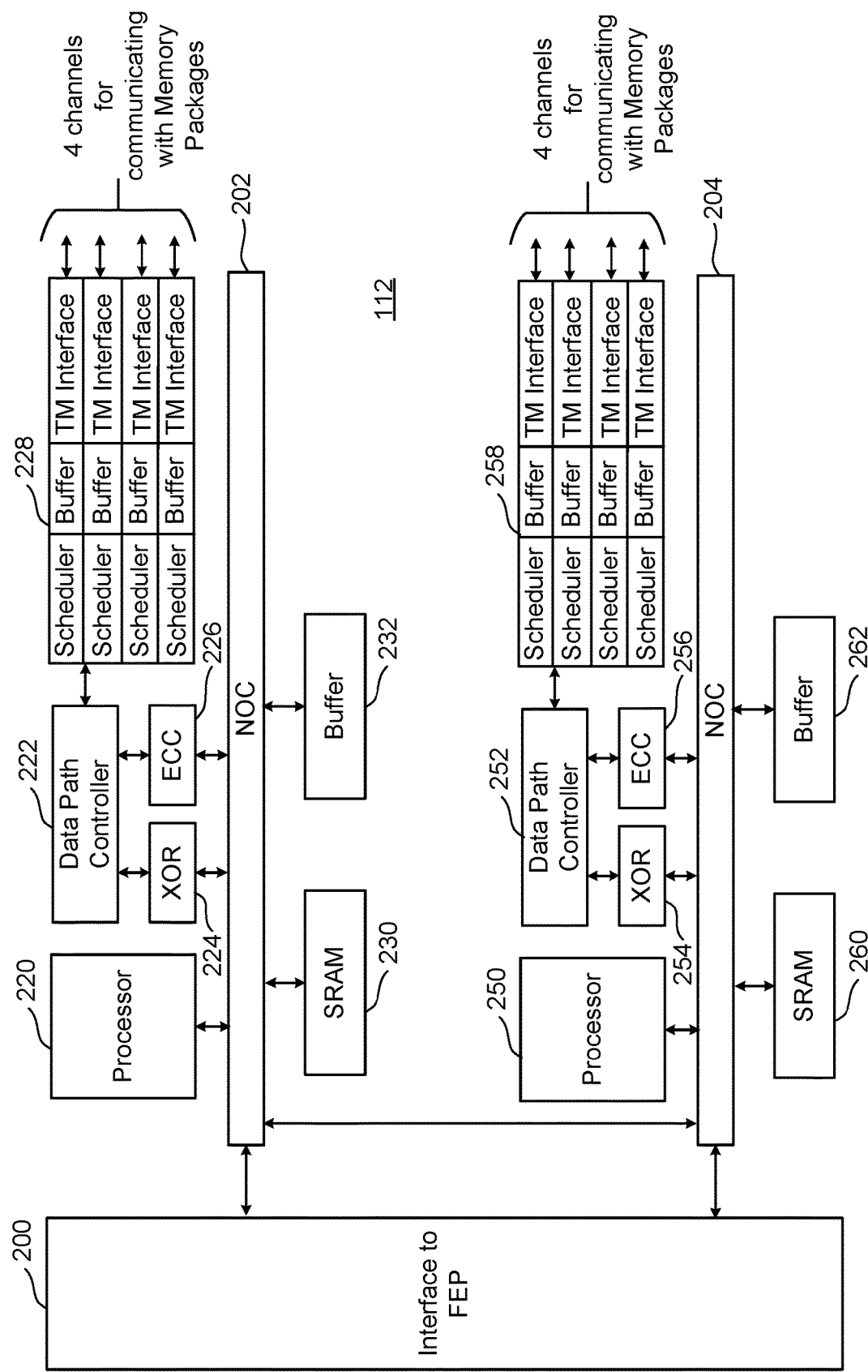
FIG. 3 is a block diagram of one embodiment of a Back-End Processor Circuit. In some embodiments, the Back-End Processor Circuit is part of a memory controller.

FIG. 3 is a block diagram of one embodiment of the BEP circuit 112. FIG. 3 shows an Interface 200 (which may be CXL, DDR, or PCIe, for example) for communicating with the FEP circuit 110 (e.g., communicating with one of Interfaces 164 and 166 of FIG. 2). Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction. The XOR engines 224/254 are used to XOR the data so that data can be combined and stored in a manner that can be recovered in case there is a programming error. Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer, and TM Interface for each of the channels. The processor can be any standard processor known in the art. The data path controllers 222/252 can be a processor, FPGA, microprocessor, or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits. In another embodiment, such circuitry and software or some portion thereof is placed on the chip in each memory.

Figure 4:
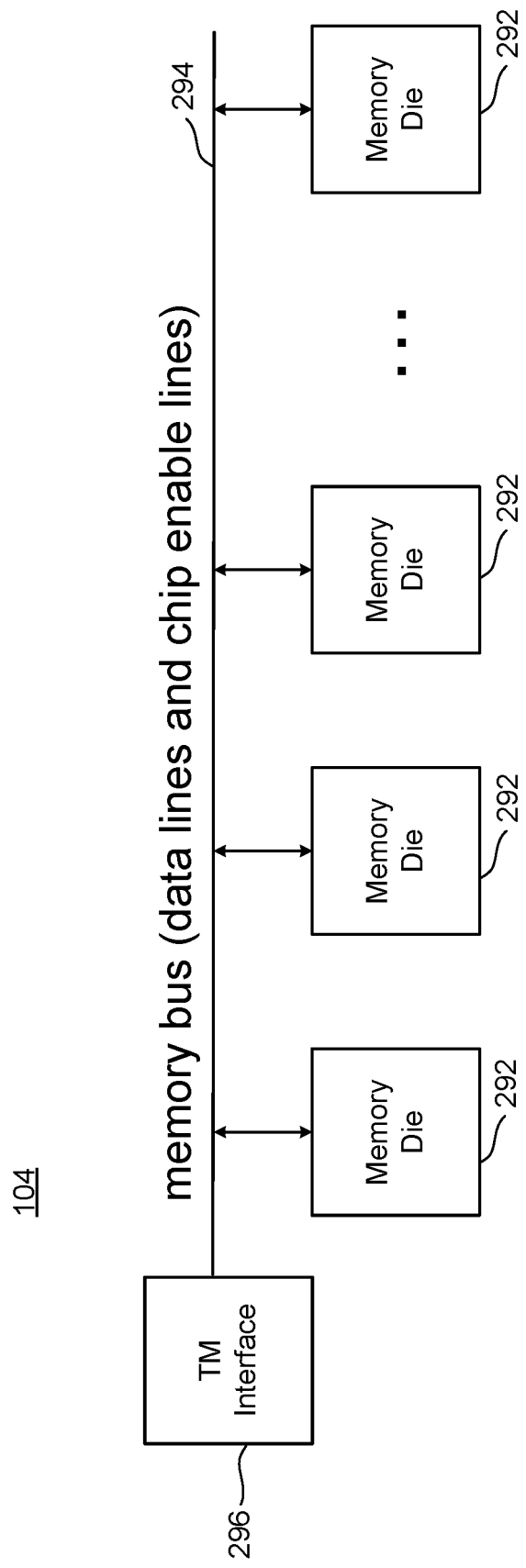
FIG. 4 is a block diagram of one embodiment of a memory package.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g., FIG. 3). In some embodiments, the memory package can include a controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 5:
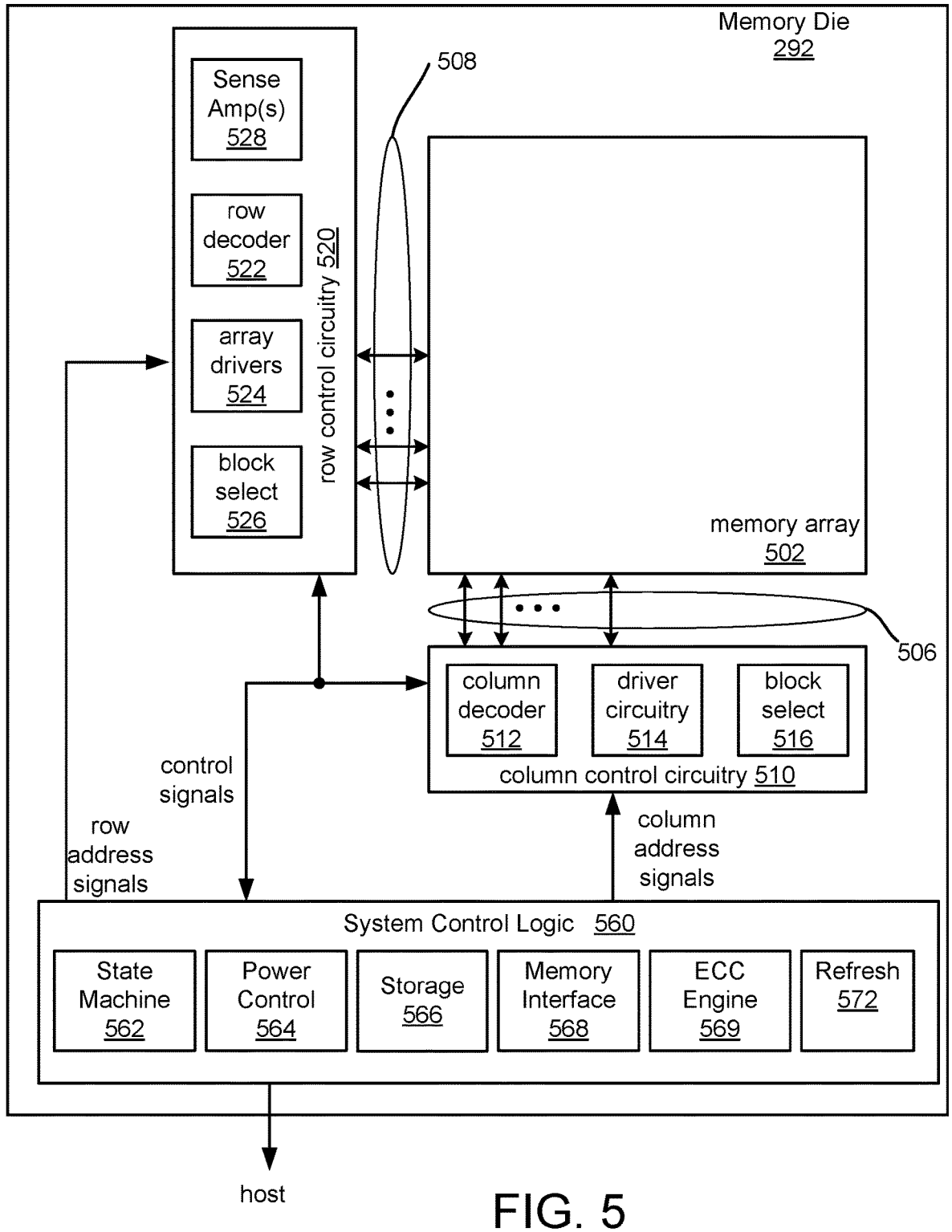
FIG. 5 is a block diagram of one embodiment of a memory die.

FIG. 5 is a block diagram that depicts one example of a memory die 292 that can implement the technology described herein. In one embodiment, memory die 292 is included in local memory 106. In one embodiment, memory die 292 is included in host memory 124. Memory die 292 includes a non-volatile memory array 502 that can include any of memory cells described herein. The array terminal lines of non-volatile memory array 502 include the various layer(s) of word lines organized as rows, and the various layer(s) of bit lines organized as columns. However, other orientations can also be implemented. Memory die 292 includes row control circuitry 520, whose outputs 508 are connected to respective word lines of the non-volatile memory array 502. Row control circuitry 520 receives a group of M row address signals and one or more various control signals from System Control Logic circuit 560, and typically may include such circuits as row decoders 522, row drivers 524, and block select circuit 526 for both reading and writing operations. Row control circuitry 520 may also include read/write circuitry. In an embodiment, row decode and control circuitry 520 has sense amplifiers 528, which each contain circuitry for sensing a condition (e.g., voltage) of a word line of the non-volatile memory array 502. In an embodiment, by sensing a word line voltage, a condition of a memory cell in a cross-point array is determined. Memory die 292 also includes column decode and control circuitry 510 whose input/outputs 506 are connected to respective bit lines of the non-volatile memory array 502. Although only a single block is shown for non-volatile memory array 502, a memory die can include multiple arrays or "tiles" that can be individually accessed. Column control circuitry 510 receives a group of N column address signals and one or more various control signals from System Control Logic 560, and typically may include such circuits as column decoders 512, column decoders and drivers 514, block select circuit 516, as well as read/write circuitry, and I/O multiplexers.

System control logic 560 receives data and commands from a host system and provides output data and status to the host system. In other embodiments, system control logic 560 receives data and commands from a separate controller circuit and provides output data to that controller circuit, with the controller circuit communicating with the host system. In another embodiment those data and commands are sent and received directly from the memory packages to the host without a separate controller, and any controller needed is within each die or within a die added to a multi-chip memory package. In some embodiments, the system control logic 560 can include a state machine 562 that provides die-level control of memory operations. In one embodiment, the state machine 562 is programmable by software. In other embodiments, the state machine 562 does not use software and is completely implemented in hardware (e.g., electrical circuits). In another embodiment, the state machine 562 is replaced by a micro-controller or microprocessor. The system control logic 560 can also include a power control module 564 controls the power and voltages supplied to the rows and columns of the non-volatile memory array 502 during memory operations and may include charge pumps and regulator circuit for creating regulating voltages. System control logic 560 includes storage 566, which may be used to store parameters for operating the non-volatile memory array 502. System control logic may be commanded by the host 120 or memory controller 102 to refresh logic 572, which shall load an on-chip stored row and column address (Pointer) which may be incremented after refresh. Such address bit(s) may be selected only (to refresh the OTS).

Commands and data are transferred between the memory controller 102 and the memory die 292 via memory controller interface 568 (also referred to as a "communication interface"). Such interface may be PCIe, CXL, DDRn for example. Memory controller interface 568 is an electrical interface for communicating with memory controller 102. Examples of memory controller interface 568 include a Toggle Mode Interface. Other I/O interfaces can also be used. For example, memory controller interface 568 may implement a Toggle Mode Interface that connects to the Toggle Mode interfaces of memory interface 228/258 for memory controller 102. In one embodiment, memory controller interface 568 includes a set of input and/or output (I/O) pins that connect to the memory controller 102. In another embodiment, the interface is JEDEC standard DDRn or LPDDRn, such as DDR5 or LPDDR5, or a subset thereof with smaller page and/or relaxed timing.

System control logic 560 located in an external controller on the memory die in the memory packages may include Error Correction Code (ECC) engine 569. ECC engine 569 may be referred to as an on-die ECC engine, as it is on the same semiconductor die as the memory cells. That is, the on-die ECC engine 569 may be used to encode data that is to be stored in the non-volatile memory array 502, and to decode the decoded data and correct errors.

In some embodiments, all of the elements of memory die 292, including the system control logic 560, can be formed as part of a single die. In other embodiments, some or all of the system control logic 560 can be formed on a different die.

In one embodiment, memory structure 502 comprises a three-dimensional non-volatile memory array of non-volatile memory cells in which multiple memory levels are formed above a single substrate, such as a wafer. The memory structure may comprise any type of non-volatile memory that is monolithically formed in one or more physical levels of memory cells having an active area disposed above a silicon (or other type of) substrate. In another embodiment, memory structure 502 comprises a two-dimensional non-volatile memory array of non-volatile memory cells.

The exact type of non-volatile memory array architecture or memory cell included in memory structure 502 is not limited to the examples above. Many different types of non-volatile memory array architectures or memory technologies can be used to form memory structure 502. No particular non-volatile memory technology is required for purposes of the new claimed embodiments proposed herein. Examples of suitable technologies for memory cells of the memory structure 502 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 502 include two dimensional arrays, three dimensional arrays, cross-point arrays, stacked two dimensional arrays, vertical bit line arrays, and the like.

One example of a ReRAM or MRAM cross-point memory includes reversible resistance-switching elements in series with and OTS selector arranged in cross-point arrays accessed by X lines and Y lines (e.g., word lines and bit lines). In another embodiment of cross-point is PCM in series with and OTS selector. In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive random access memory (MRAM) stores data using magnetic storage elements. The elements are formed from two ferromagnetic layers, each of which can hold a magnetization, separated by a thin insulating layer. For a field-controlled MRAM, one of the two layers is a permanent magnet set to a particular polarity; the other layer's magnetization can be changed to match that of an external field to store memory. Other types of MRAM cells are possible. A memory device may be built from a grid of MRAM cells. In one embodiment for programming, each memory cell lies between a pair of write lines arranged at right angles to each other, parallel to the cell, one above and one below the cell. For some MRAM cells, when current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). The memory cells are programmed by current pulses that can change the co-ordination of the PCM material or switch it between amorphous and crystalline states. Note that the use of "pulse" in this document does not require a square pulse but includes a (continuous or non-continuous) vibration or burst of sound, current, voltage light, or other wave. And the current forced for Write can, for example, be driven rapidly to a peak value and then linearly ramped lower with, for example, a 500 ns edge rate. Such peak current force may be limited by a zoned voltage compliance that varies by position of the memory cell along the word line or bit line.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 5 can be grouped into two parts, the memory structure 502 and the peripheral circuitry, including all of the other elements. An important characteristic of a memory circuit is its capacity, which can be increased by increasing the area of the memory die 292 that is given over to the memory structure 502; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 560, reduced availability of area can limit the available functionalities that can be implemented on-chip. Consequently, a basic trade-off in the design of a memory die 292 is the amount of area to devote to the memory structure 502 and the amount of area to devote to the peripheral circuitry. Such tradeoffs may result in more IR drop from use of larger x-y arrays of memory between driving circuits on the word line and bit line, which in turn may be benefit more from use of voltage limit and zoning of the voltage compliance by memory cell position along the word line and bit line.

Another area in which the memory structure 502 and the peripheral circuitry are often at odds is in the processing involved in forming these regions, since these regions often involve differing processing technologies and the trade-off in having differing technologies on a single die. For example, elements such as sense amplifier circuits, charge pumps, logic elements in a state machine, and other peripheral circuitry in system control logic 560 often employ PMOS devices. In some cases, the memory structure will be based on CMOS devices. Processing operations for manufacturing a CMOS die will differ in many aspects from the processing operations optimized for an NMOS technologies.

Figure 6:
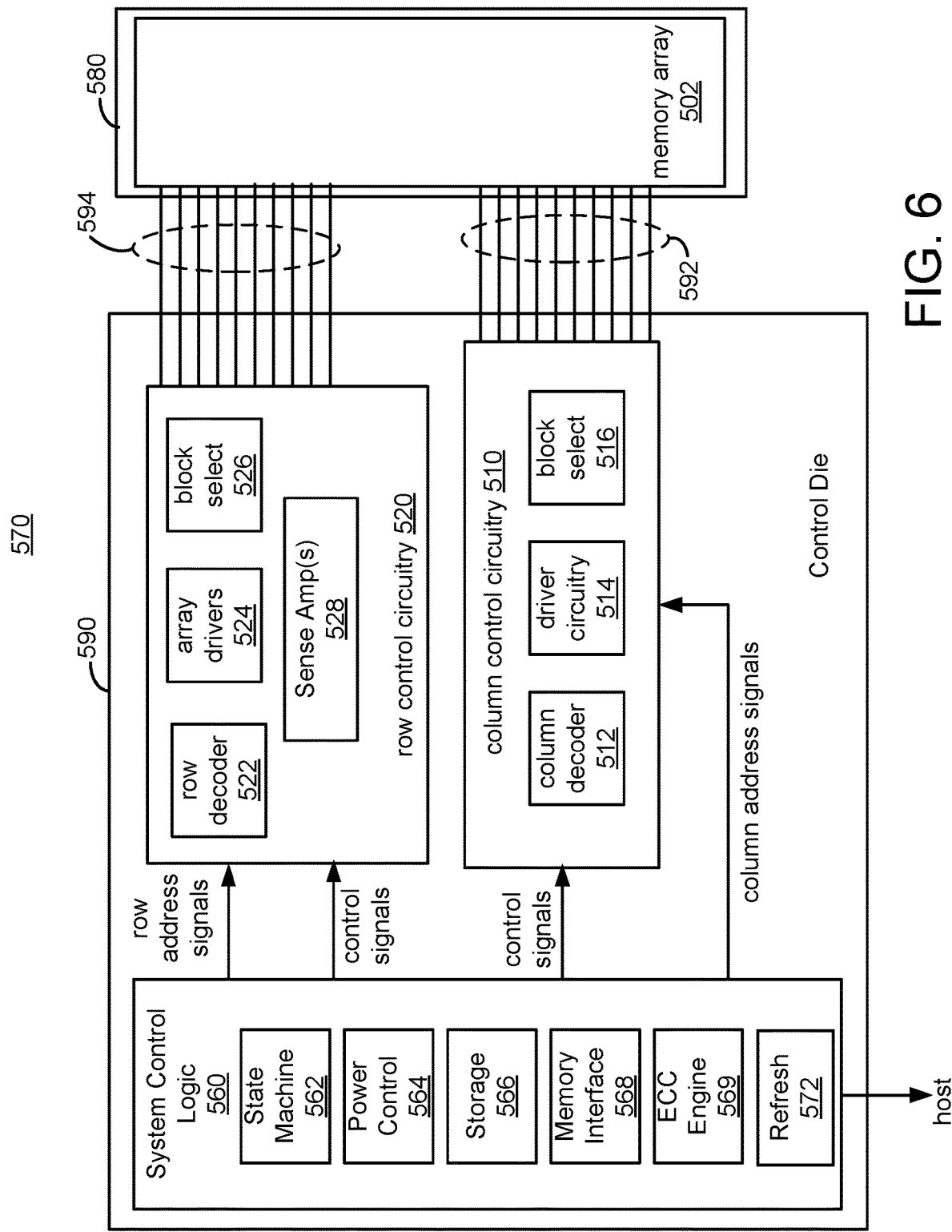
FIG. 6 is a block diagram of one embodiment of an integrated memory assembly containing a control die and a memory structure die.

To improve upon these limitations, embodiments described below can separate the elements of FIG. 5 onto separately formed dies that are then bonded together. FIG. 6 depicts an integrated memory assembly 570 having a memory structure die 580 and a control die 590. The memory structure 502 is formed on the memory structure die 580 and some or all of the peripheral circuitry elements, including one or more control circuits, are formed on the control die 590. For example, a memory structure die 580 can be formed of just the memory elements, such as the array of memory cells of MRAM memory, PCM memory, ReRAM memory, or other memory type. Some or all of the peripheral circuitry, even including elements such as decoders and sense amplifiers, can then be moved on to the control die. This allows each of the semiconductor dies to be optimized individually according to its technology. This allows more space for the peripheral elements, which can now incorporate additional capabilities that could not be readily incorporated were they restricted to the margins of the same die holding the memory cell array. The two die can then be bonded together in a bonded multi-die integrated memory assembly, with the array on the one die connected to the periphery elements on the other die. Although the following will focus on an integrated memory assembly of one memory die and one control die, other embodiments can use additional dies, such as two memory dies and one control die, for example.

As with 502 of FIG. 5, the memory structure die 580 in FIG. 6 can include multiple independently accessible arrays or "tiles." System control logic 560, row control circuitry 520, and column control circuitry 510 are located in control die 590. In some embodiments, all or a portion of the column control circuitry 510 and all or a portion of the row control circuitry 520 are located on the memory structure die 580. In some embodiments, some of the circuitry in the system control logic 560 is located on the on the memory structure die 580.

FIG. 6 shows column control circuitry 510 on the control die 590 coupled to memory structure 502 on the memory structure die 580 through electrical paths 592. For example, electrical paths 592 may provide electrical connection between column decoder 512, column driver circuitry 514, and block select 516 and bit lines of memory structure 502. Electrical paths may extend from column control circuitry 510 in control die 590 through pads on control die 590 that are bonded to corresponding pads of the memory structure die 580, which are connected to bit lines of memory structure 502. Each bit line of memory structure 502 may have a corresponding electrical path in electrical paths 592, including a pair of bond pads, which connects to column control circuitry 510. Similarly, row control circuitry 520, including row decoder 522, row drivers 524, block select circuit 526, and sense amplifiers 528 are coupled to memory structure 502 through electrical paths 594. Each electrical path 594 may correspond to, for example, a word line. Additional electrical paths may also be provided between control die 590 and memory structure die 580.

For purposes of this document, the phrase "a control circuit" can include one or more of memory controller 102, system control logic 560, column control circuitry 510, row control circuitry 520, a micro-controller, a state machine, host processor 122, and/or other control circuitry, or other analogous circuits that are used to control non-volatile memory. The control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit. Such control circuitry may include drivers such as direct drive via connection of a node through fully on transistors (gate to the power supply) driving to a fixed voltage such as a power supply. Such control circuitry may include a current source driver.

For purposes of this document, the term "apparatus" can include, but is not limited to, one or more of host system 120, the combination of host processor 122 and host memory 124, host memory 124, memory system 100, memory controller 102, local memory 106, the combination of memory controller 102 and local memory 106, memory package 104, memory die 292, integrated memory assembly 570, and/or control die 590.

Figure 7A:
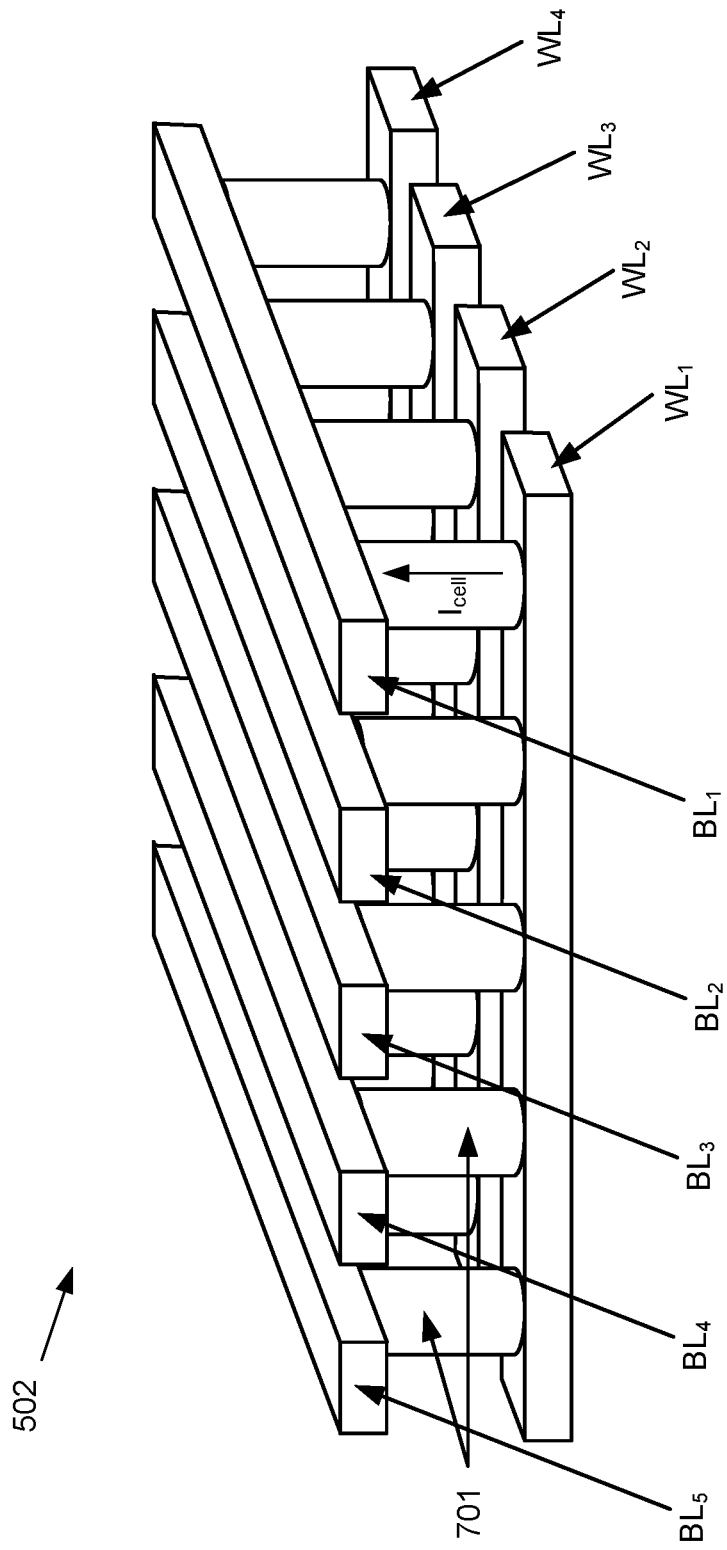
FIG. 7A depicts one embodiment of a portion of a non-volatile memory array that forms a cross-point architecture in an oblique view.

FIG. 7A depicts one embodiment of a portion of a non-volatile memory array that forms a cross-point architecture in an oblique view. Non-volatile memory array 502 of FIG. 7A is one example of an implementation for non-volatile memory array 502 in FIG. 5 or 6, where a memory die 292 or memory structure die 580 can include multiple such array structures. The non-volatile memory array 502 may be included in local memory 106 or host memory 124. The bit lines $BL_1$-$BL_5$ are arranged in a first direction (represented as running into the page) relative to an underlying substrate (not shown) of the die and the word lines $WL_1$-$WL_5$ are arranged in a second direction perpendicular to the first direction. FIG. 7A is an example of a horizontal cross-point structure in which word lines $WL_1$-$WL_5$ and $BL_1$-$BL_5$ both run in a horizontal direction relative to the substrate, while the memory cells, two of which are indicated at 701, are oriented so that the current through a memory cell (such as shown at $I_{cell}$) runs in the vertical direction. In a non-volatile memory array with additional layers of memory cells, such as discussed below with respect to FIG. 7D, there would be corresponding additional layers of bit lines and word lines.

As depicted in FIG. 7A, non-volatile memory array 502 includes a plurality of memory cells 701. The memory cells 701 may include re-writeable memory elements, such as can be implemented using ReRAM, MRAM, PCM, or other material with a programmable resistance. A memory cell that includes a MRAM memory element will be simply denoted as an MRAM memory cell. The memory cells 701 may also include selector elements, such as can be implemented using an Ovonic Threshold Switch (OTS), Volatile Conductive Bridge (VCB), Metal-Insulator-Metal (MIM), or other material that provides a highly non-linear dependence of current on select voltage. The following discussion will focus on memory cells composed of an MRAM memory elements combined in series with an Ovonic Threshold switch, although much of the discussion can be applied more generally. The current in the memory cells of the first memory level is shown as flowing upward as indicated by arrow $I_{cell}$, but current can flow in either direction, as is discussed in more detail in the following.

Figure 7B:
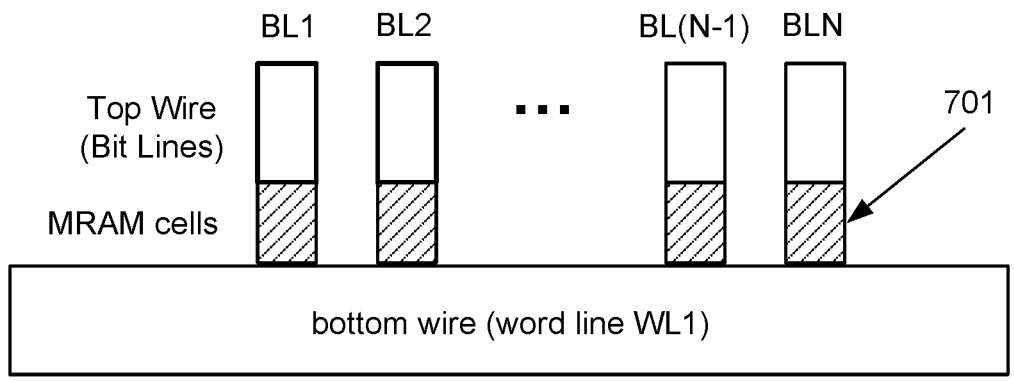
FIGS. 7B and 7C respectively present side and top views of the cross-point structure in FIG. 7A.
Figure 7C:
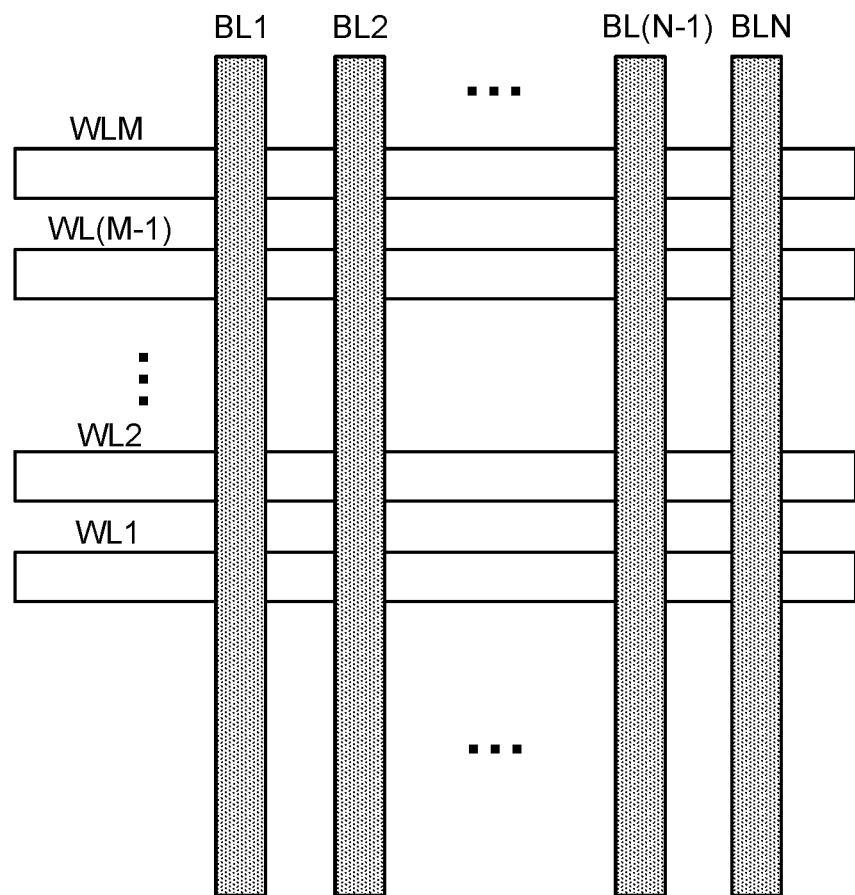
Figures 12A, 12B:
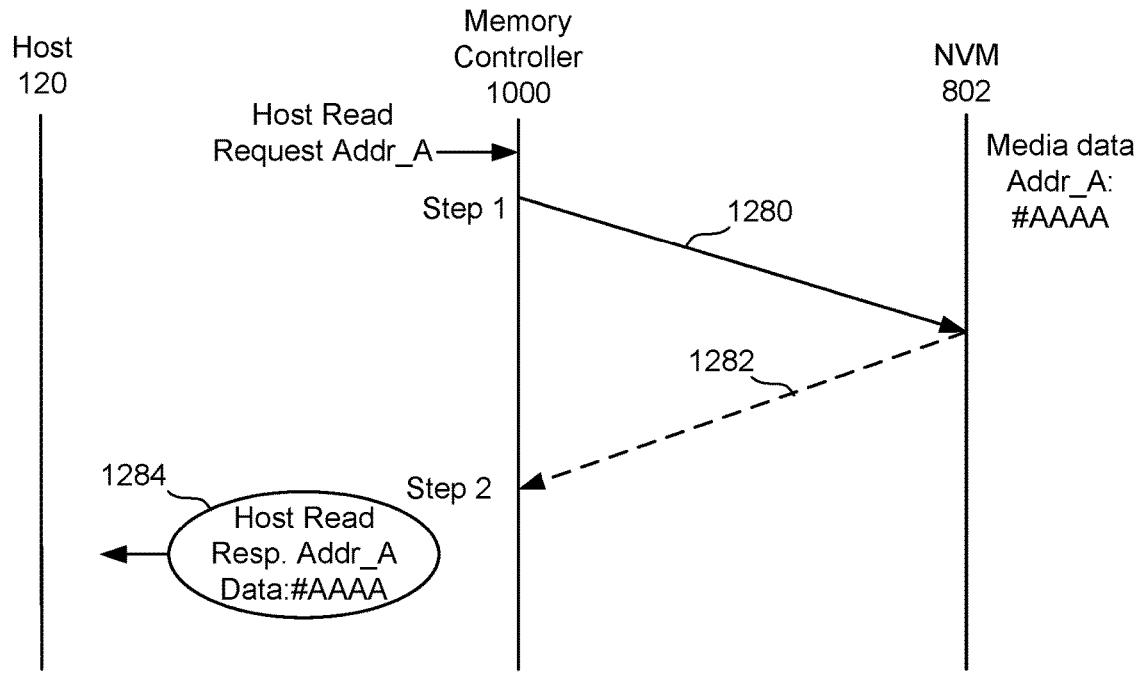
FIGS. 12A-B illustrate an example of a memory controller with a common request buffer handling a host read request.

FIGS. 7B and 7C respectively present side and top views of the cross-point structure in FIG. 7A. The sideview of FIG. 7B shows one bottom wire, or word line, $WL_1$ and the top wires, or bit lines, $BL_1$-$BL_n$. At the cross-point between each top wire and bottom wire is an MRAM memory cell 701, although PCM, ReRAM, or other technologies can be used as the memory element. FIG. 7C is a top view illustrating the cross-point structure for M bottom wires $WL_1$-$WL_M$ and N top wires $BL_1$-$BL_N$. In a binary embodiment, the MRAM cell at each cross-point can be programmed into one of two resistance states: high and low. More details on embodiments for an MRAM memory cell design and techniques for their reading are given below. In some embodiments, sets of these wires are arrayed continuously as a "tile", and such tiles may be paired adjacently in the Word Line (WL) direction and orthogonally in the Bit Line direction to create a module. Such a module may be composed of 2×2 tiles to form a four tile combination wherein the WL drivers between the tiles is "center driven" between the tiles with the WL running continuously over the driver at the approximate center of the line. Similarly, BL drivers may be located between the pair of tiles paired in the BL direction to be center driven, whereby the driver and its area is shared between a pair of tiles. One embodiment of a module having four tiles is shown in FIG. 12B, which will be discussed below.

The cross-point array of FIG. 7A illustrates an embodiment with one layer of word lines and bits lines, with the MRAM or other memory cells sited at the intersection of the two sets of conducting lines. To increase the storage density of a memory die, multiple layers of such memory cells and conductive lines can be formed. A two-layer example is illustrated in FIG. 7D.

Figure 7D:
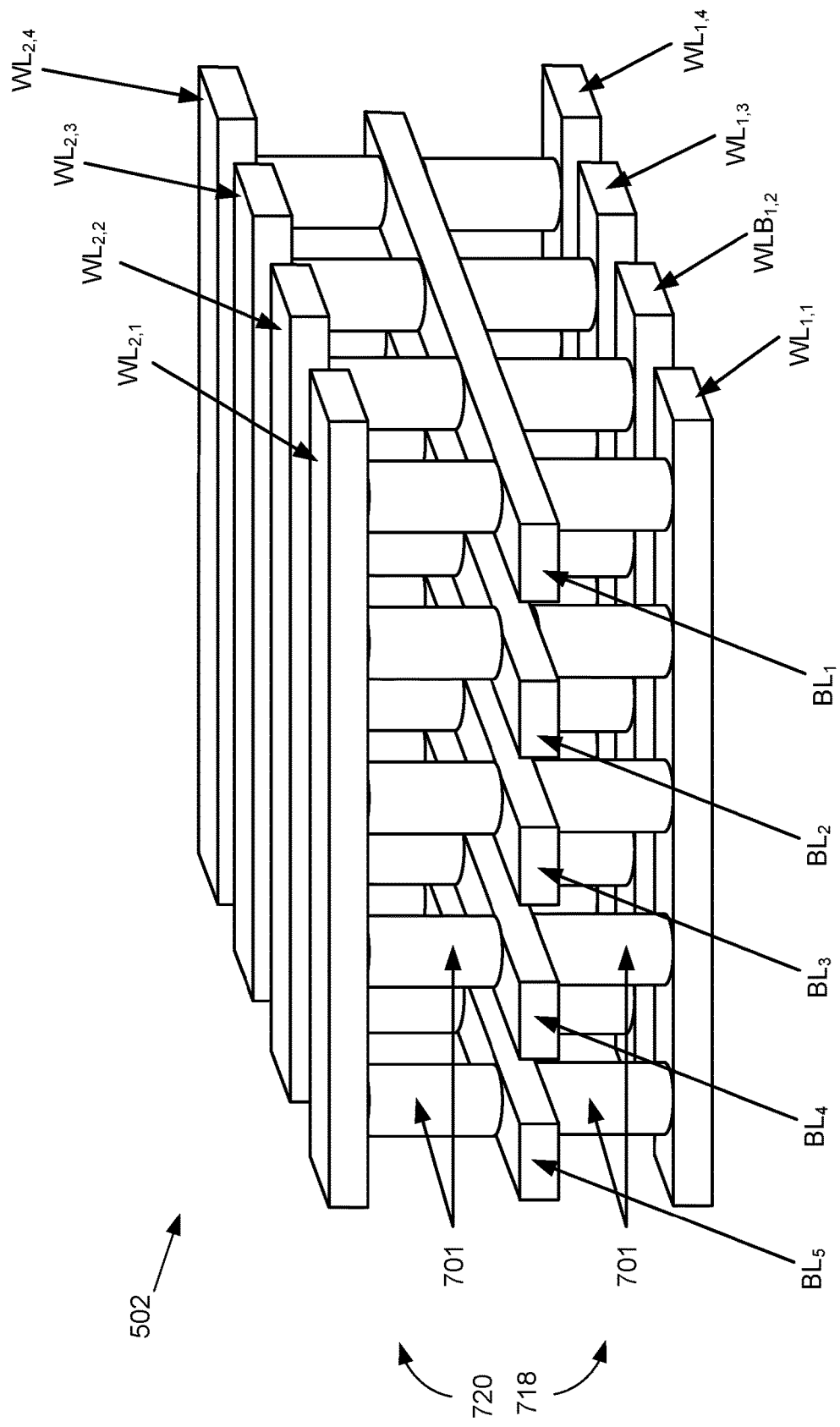
FIG. 7D depicts an embodiment of a portion of a two-level non-volatile memory array that forms a cross-point architecture in an oblique view.

FIG. 7D depicts an embodiment of a portion of a two-level non-volatile memory array that forms a cross-point architecture in an oblique view. As in FIG. 7A, FIG. 7D shows a first layer 718 of memory cells 701 of a non-volatile memory array 502 connected at the cross-points of the first layer of word lines $WL_{1,1}$-$WL_{1,4}$ and bit lines $BL_1$-$BL_5$. A second layer of memory cells 720 is formed above the bit lines $BL_1$-$BL_5$ and between these bit lines and a second set of word lines $WL_{2,1}$-$WL_{2,4}$. Although FIG. 7D shows two layers, 718 and 720, of memory cells, the structure can be extended upward through additional alternating layers of word lines and bit lines. Depending on the embodiment, the word lines and bit lines of the array of FIG. 7D can be biased for read or program operations such that current in each layer flows from the word line layer to the bit line layer or the other way around. The two layers can be structured to have current flow in the same direction in each layer for a given operation or to have current flow in the opposite directions by driver selection in the positive or negative direction.

The use of a cross-point architecture allows for arrays with a small footprint and several such arrays can be formed on a single die. The memory cells formed at each cross-point can be a resistive type of memory cell, where data values are encoded as different resistance levels. Depending on the embodiment, the memory cells can be binary valued, having either a low resistance state or a high resistance state, or multi-level cells (MLCs) that can have additional resistance intermediate to the low resistance state and high resistance state. The cross-point arrays described here can be used in the memory die 292 of FIG. 4, the local memory 106 in FIG. 1, and/or the host memory 124 in FIG. 1. Resistive type memory cells can be formed according to many of the technologies mentioned above, such as ReRAM, PCM, FeRAM, or MRAM. The following discussion is presented mainly in the context of non-volatile memory arrays using a cross-point architecture with binary valued MRAM memory cells, although much of the discussion is more generally applicable and the present technology is not limited to any particular memory structure.

Some non-volatile memory structures, including ReRAM, PCM, and MRAM, may be used as replacements for DRAM or other volatile memories in some designs and may be referred to as "storage class memory" or "emerging memory." In some cases, such memories must meet difficult specifications such as bandwidth and latency requirements. Meeting such requirements may be challenging and the present technology provides examples of technical solutions to problems related to using non-volatile memories (e.g., ReRAM, PCM, and MRAM) in demanding applications (e.g., with difficult bandwidth, latency and/or other requirements).

In some cases, non-volatile memories may present challenges that are not presented by volatile memories (e.g., due to their different structures). This may make adapting techniques from volatile memories for operation with non-volatile memories difficult. For example, non-volatile memory such as MRAM may have more data errors (higher Bit Error Rate, or BER) than volatile memory and may require some media management such as wear leveling, patrol scrub (scrubbing data according to a schedule or plan) and demand scrub (scrubbing data found to have high BER), which may be unnecessary in volatile memory. Some phenomena that may not be significant in volatile memory may be significant in non-volatile memory. For example, read disturb effects may cause the BER of data in non-volatile memory to increase significantly when it is read, while no significant increase may be seen in volatile memory. These and other differences may make it difficult to directly use techniques from volatile memory technology with non-volatile memories. For example, techniques used by memory controllers that interface with volatile memories (e.g., DRAM) may not easily be adapted for use with non-volatile memories (e.g., MRAM).

Figure 8A:
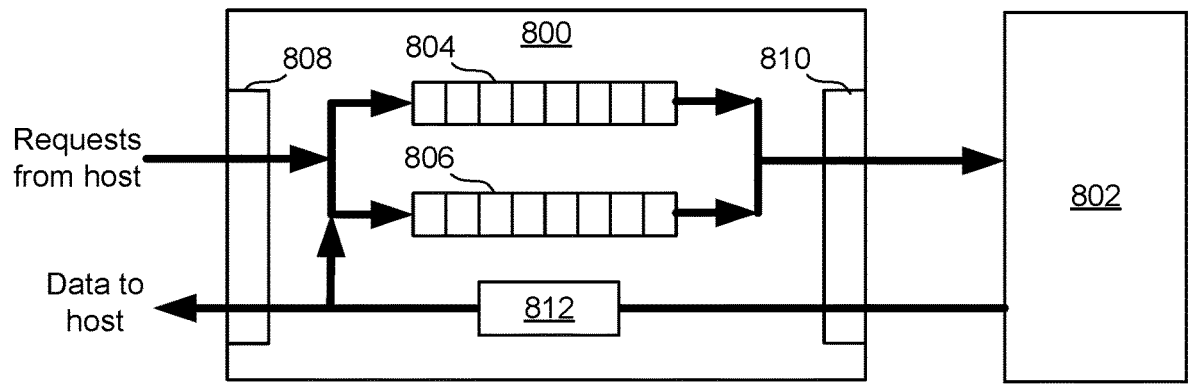
FIGS. 8A-B illustrate operation of a memory controller with read and write queues.

FIG. 8A shows an example of a queue-based memory controller 800 connected to a non-volatile memory 802 (an MRAM memory in this example). Queue-based memory controllers have been used successfully with volatile memories such as DRAM. However, queue-based memory controllers present certain problems for use with non-volatile memories. Memory controller 800 includes two separate queues, a read request queue 804 and a write request queue 806. Host requests (e.g., read and write requests) may be received from a host through an interface 808 and may be separated and queued in respective queues so that read access and write access are separately managed. A memory interface 810 enables read and write operations directed at addresses in non-volatile memory 802. An Error Correction Circuit, or ECC engine 812 is included in memory controller 800 to enable encoding of data prior to storage in non-volatile memory 802 and decoding (error detection and correction) of data read from non-volatile memory 802.

Figure 8B:
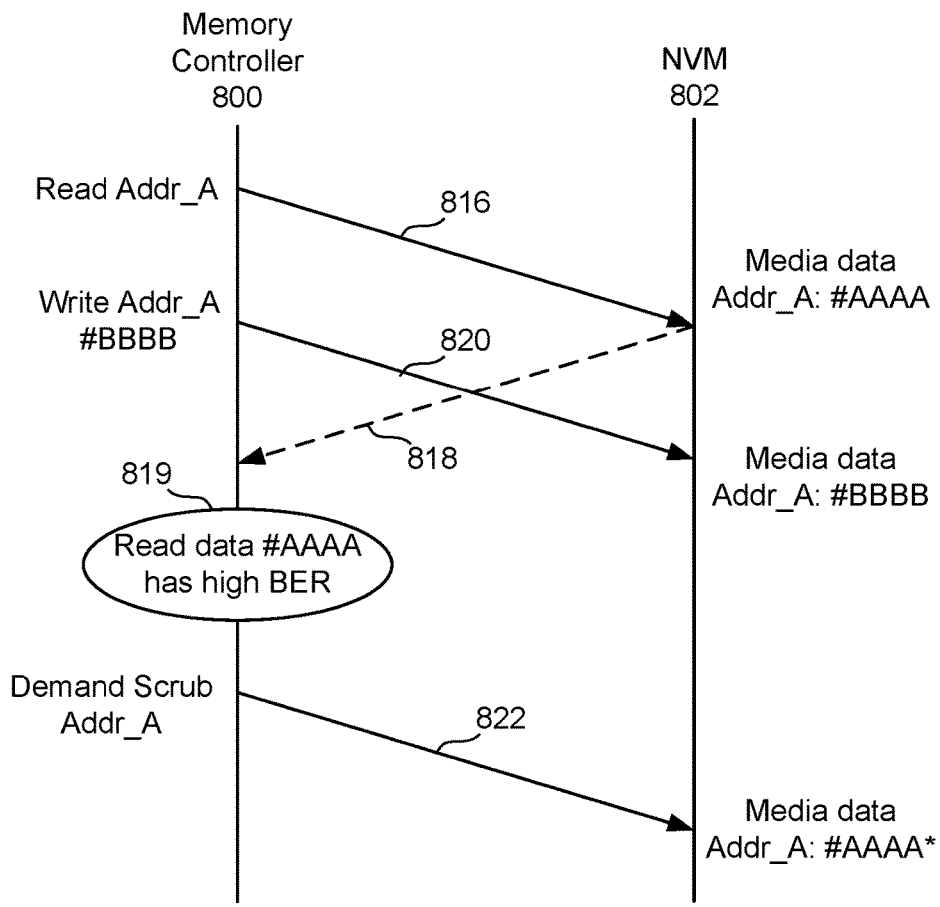

FIG. 8B illustrates an example of operation of a queue based memory controller (e.g., memory controller 800 of FIG. 8A) in a scenario in which a read request directed to an address is followed by a write request to the same address. A read request "Read Addr_A" is received by memory controller 800 via interface 808 and is placed in read request queue 804. Then memory command 816 is sent from memory controller 800 to non-volatile memory 802 (NVM) to read address A. The host data stored at address A of non-volatile memory 802 is #AAAA ("Media data Addr_A: #AAAA") at this time. This host data (#AAAA) is read from the non-volatile memory 802 and returned to memory controller 800 in a read response 818.

A write request is received subsequent to the read request and is placed in write request queue 806. The read request specifies data #BBBB to be written at address A ("Write Addr_A #BBBB"). For example, a host may want to replace host data #AAAA with host data #BBBB. A corresponding memory command 820 is sent from memory controller 800 to non-volatile memory 802, which causes host data #BBBB to be written at Addr_A 5/"Media data Addr_A: #BBBB). Thus, host data #AAAA, which was previously at Addr_A is replaced by host data #BBBB at this time.

In the example shown, the read data #AAAA is decoded (e.g., by ECC engine 812) and found to have a high BER 819. This triggers a demand scrub of data at address A ("Demand Scrub Addr_A"). For example, the BER may be above a threshold that causes the ECC-corrected data to be written back to Addr_A to thereby reduce the BER of the stored data (a write request may be generated and placed in write request queue 806 with corrected data #AAAA* from ECC engine 812). A memory command 822 is sent to non-volatile memory with a corrected version of data #AAAA (designated "#AAAA*"), which causes the corrected data to be written at address A ("Media data Addr_A: #AAAA*"). Thus, data #BBBB, which was previously at Addr_A is replaced by data #AAAA* at this time. This may mean that data #BBBB, which the host sent to replace stored data #AAAA may be lost. If the host wants data #BBBB, it will send a command to read Addr_A and will receive data #AAAA* instead (i.e., it will receive the wrong data). Such a scenario may be difficult to manage with separate read and write queues.

Figure 9A:
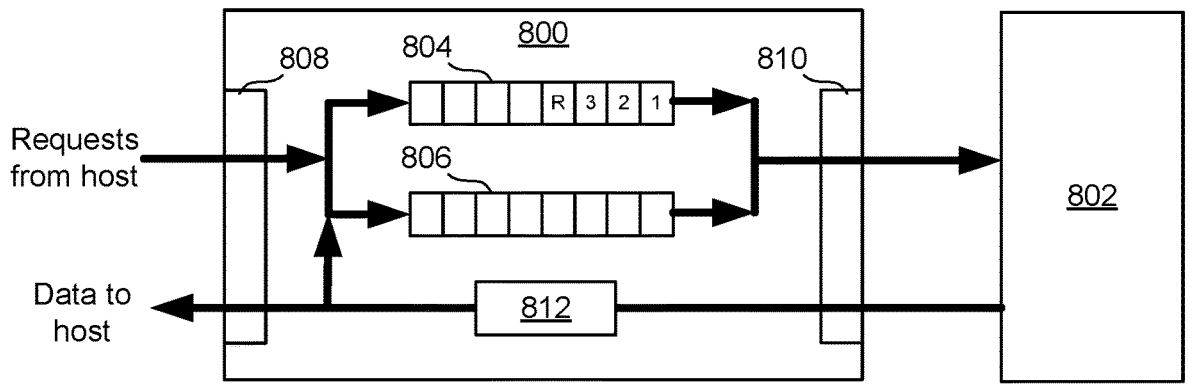
FIGS. 9A-B illustrate repeated reads handled by a memory controller with separate read and write queues.
Figure 9B:
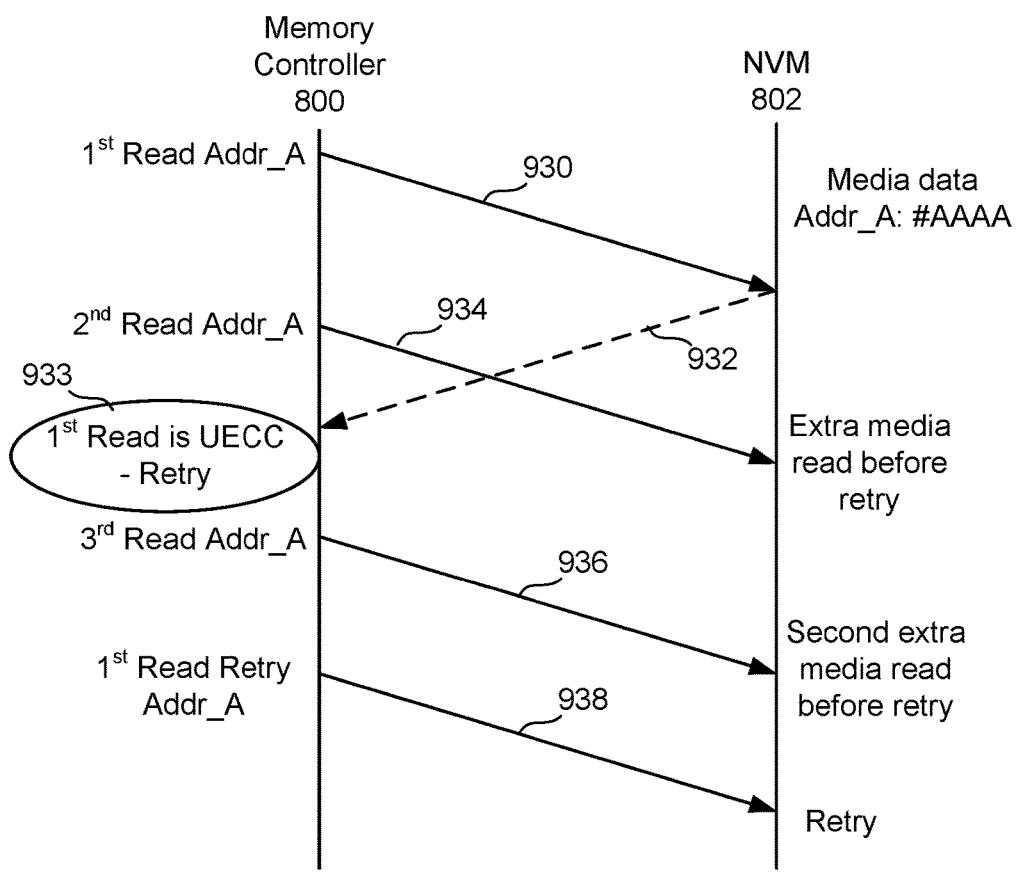

FIGS. 9A-B illustrate another problematic scenario for a queue-based memory controller (e.g., memory controller 800). In this example, read request queue 804 includes three read requests directed to the same address (shown as entries marked "1," "2," and "3" in request queue 804 of FIG. 9A). In response to the first read request directed to address A ("Pt Read Addr_A" in FIG. 9B), memory controller 800 sends a memory command 930 to non-volatile memory 802, which causes the data at address A ("Media data Addr_A: #AAAA") to be sent from non-volatile memory 802 to memory controller 800 (read response 932). In this example, the data is found to have a high BER that causes it to be Uncorrectable by ECC (UECC), which causes a retry ("Pt Read is UECC—Retry" 933). Retry means that the data at address A is to be read again (e.g., using different parameters) to attempt to obtain data with a lower BER that can be corrected. A retry read request is placed in read request queue 804 (shown as "R" in FIG. 9A) behind the second and third read requests ("2" and "3").

The second read request ("$2^{nd}$ Read Addr_A") causes a second memory command 934 from memory controller 800 to non-volatile memory 802, which causes another read at address A ("Extra media read before retry"). The third read request ("3rd Read Addr_A") causes a third memory command 936 from memory controller 800 to non-volatile memory 802, which causes yet another read at address A ("Second extra media read before retry"). The retry read request "R" is only taken from read request queue 804 after the second and third read requests. In response to the retry read request ("$1^{st}$ Read Retry Addr_A"), memory controller 800 sends a memory command 938 to non-volatile memory 802, which causes non-volatile memory to perform a retry read (e.g., read using different parameters to the first read). It can be seen that the queue-based example of FIGS. 9A-B is not optimal because there are extra reads to the uncorrectable address before a read retry. These extra reads impose additional read disturb to memory media, and thus reduce the correctable probability from the retry read.

Examples of the present technology use a common request buffer, which may be used to manage different types of host/front-end access (different types of requests) to a non-volatile memory array. No separate dedicated queues may be needed in this arrangement, which may avoid problematic scenarios such as shown in FIGS. 8A-B and 9A-B.

Figure 10A:
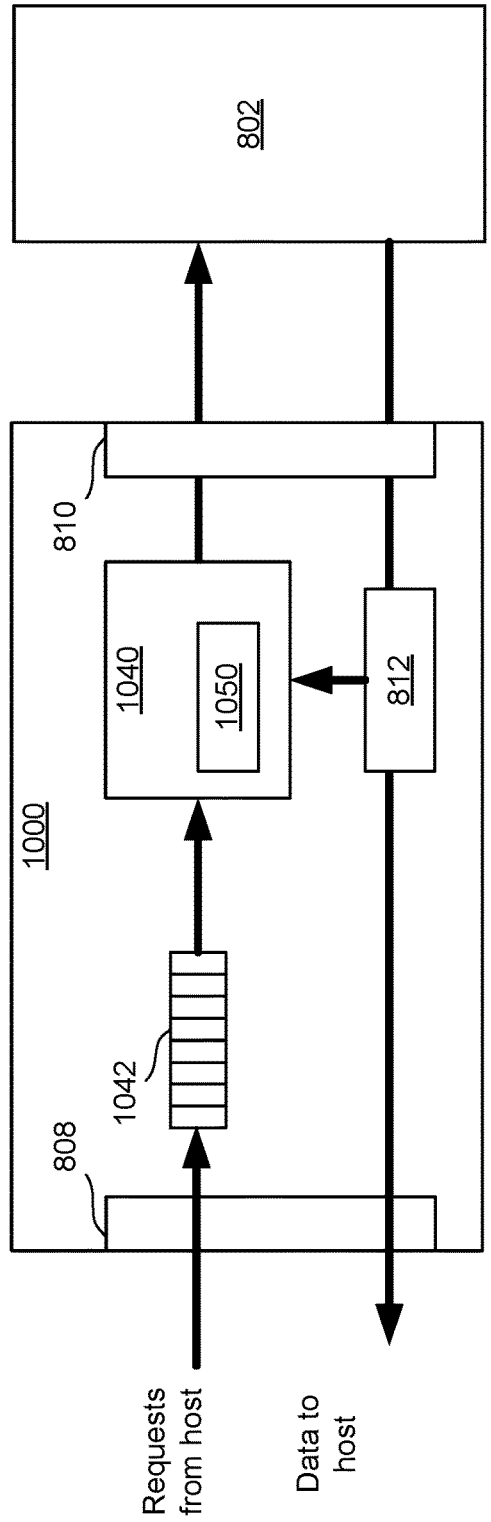
FIGS. 10A-B illustrate an example of a memory controller with a common request buffer.

FIG. 10A shows an example of a memory controller 1000 that includes a common request buffer 1040 that is configured to hold host requests of different types (not limited to a single type of host request such as only read requests or only write requests) and other requests (e.g., media management logic requests). A Common Request Queue 1042 is connected to common request buffer so that requests to the same address are placed in Common Request Queue 1042 in the order in which they are received from the host (received order) and are transferred from common request queue 1042 to common request buffer 1040 in the received order. An interface 808, memory interface 810 and ECC engine 812 are provided as previously described (similar features are similarly numbered). For example, interface 808 may be implemented by interface 150, interface 200 and/or additional components of FEP 110 and/or BEP 112, memory interface 810 may be implemented by interface 228/258/568 and/or additional components of BEP 112 and ECC engine 812 may be implemented by ECC engine 226/256/569 and/or other ECC circuits. Common request buffer 1040 and common request queue 1042 may be implemented by any suitable circuits such as SRAM 160, SRAM 230/260, storage 566 and/or other suitable circuits. In an example, common request buffer 1040, common request queue 1042, ECC engine 812 and memory interface 810 of FIG. 10A may partially or entirely replace XOR engine 224, ECC engine 226, data path controller 222 and interface 228 of FIG. 3. Interface 808 may be internal to memory controller 800 and, in addition to host requests, may receive non-host requests from components of memory controller 800. For example, interface 808 may be an interface between a front-end and a back-end of a memory controller (e.g., Interface to FEP 200 of FIG. 3). In addition to host requests, interface 808 may receive requests from front-end components, for example, media management requests from Media Management Layer (e.g., MML 158). Additional components of memory controller 1000 are not shown in FIG. 10A for clarity of illustration (e.g., front-end components). Memory controller 1000 may include additional components in any suitable arrangement (e.g., as previously illustrated in FIGS. 1-6).

When a host request is moved from common request queue 1042 to common request buffer 1040, a corresponding entry (e.g., entry 1050) is generated in common request buffer 1040 and is maintained at least until the host request is finished (e.g., until a response has been provided to the host to indicate that the host request is finished). A common request buffer may be configured to hold a suitable number of such entries to allow multiple memory access operations directed to different addresses to be managed in parallel (e.g., eight, sixteen, thirty two, sixty four or more entries). For any address only one entry for an unfinished host request is present at any time (a subsequent host request directed to a given address may be blocked by being held in common request queue 1042 until a prior host request is finished) so that conflicts between multiple requests to the same address are avoided. Thus, for any given address, requests are output from common request queue 1042 to common request buffer 1040 in their received order. Requests for different addresses may be output out of received order. For example, if the next request in the common request queue is blocked because there is a request in the common request buffer for the same address (address A), then the next request is taken if it is directed to a different address (address B) even if the queued request for address A was received before the queued request for address B. An entry in common request buffer 1040 may include fields that relate to the host requests and to any memory commands generated in response to the host request.

Figure 10B:
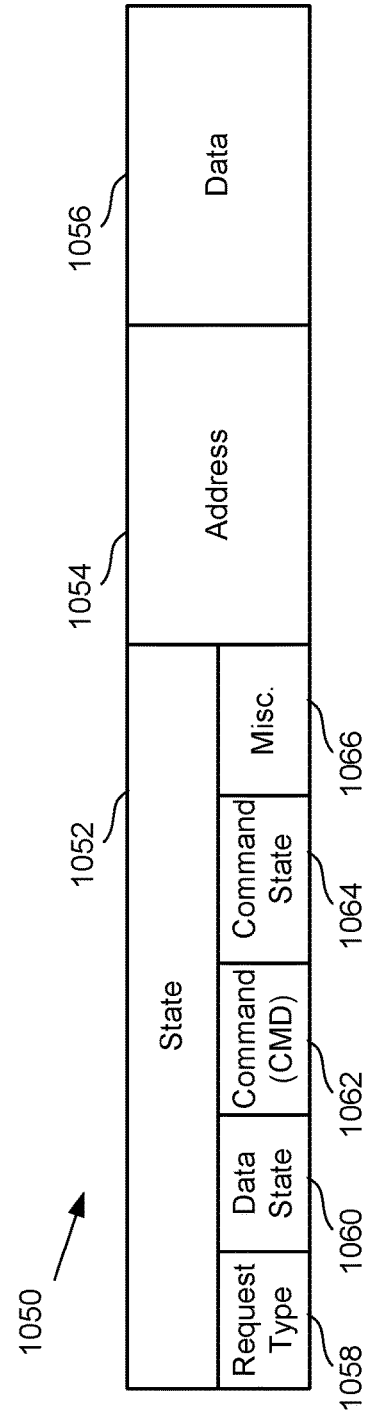

FIG. 10B illustrates an example of entry 1050 generated in common request buffer 1040 in response to a host request. Entry 1050 may be generated in response to a host request that is taken from common request queue 1042 in the received order. Entry 1050 includes a State field 1052, which contains information regarding the host request and the current status of the request, an Address field 1054, which contains the address or addresses to which the host request is directed (e.g., source address of data to be read or destination address of data to be written) and a Data field 1056, which contains the data (e.g., data to be written in a host write request).

State field 1052 includes a number of sub-fields (or simply "fields"). A Request Type field 1058 may indicate the type (host request type) of the corresponding request and may be referred to as the "request type field." For example, a request may be a Host Read request that specifies reading of data from a corresponding address, a Refresh request in which the host specifies that data at a corresponding address is to be refreshed, a Wear Level Move (WLM) request in which the MML (158) specifies that data is to be moved from a source address to a destination address or other host request. Corresponding indicators may be provided in Request Type field 1058. An "Invalid" indicator in Request Type field 1058 may indicate that there is no corresponding unfinished request. In an example, a host write request results in an "Invalid" indicator in Request Type field 1058, which may allow another entry with the same address to be generated in common request buffer 1040.

A Data State field 1060 may indicate the state of corresponding Data field 1056 in common request buffer 1040. For example, the Data State may be "Dirty" indicating that the data in Data field 1056 is not saved in non-volatile memory 802, "Clean" indicating that the data in Data field 1056 is saved in non-volatile memory 802, "Invalid" indicating that there is no valid data in Data field 1056 at this time or "Waiting-For-Data" indicating that valid data is not currently in Data field 1056 and an operation to place valid data there is ongoing or expected. In some cases, Data State field 1060 may include write priority information associated with any host write request, which may facilitate prioritization of write operations.

A Command (CMD) field 1062 (memory command field) may specify a memory command (from memory controller 1000 to non-volatile memory 802) corresponding to the received host request. For example, Command field 1062 may specify "Fast Read" corresponding to a read operation in non-volatile memory 802, which may be relatively fast (and may have a relatively high BER), "Extended Read" corresponding to a read operation in non-volatile memory 802, which may be relatively slow (and may have a relatively low BER), "Write" corresponding to a write operation to write data at a specified address in non-volatile memory 802 or "Invalid" when no memory command is currently ongoing.

A Command State field 1064 (memory command state field) may include an indicator of the current state (or status) of a command specified in Command field 1062 (e.g., a state indicator). For example, Command State field 1064 may specify "Await-Scheduling" when a corresponding memory command has been generated but has not yet been sent, "In-Process" when the corresponding memory command is being executed in non-volatile memory 802 or "Invalid" when there is no corresponding memory command.

A Miscellaneous (Misc.) field 1066 allows additional information (e.g., scheduling information, etc.) that may be related to the host request to be stored in an entry 1050 in common request buffer 1040.

While FIG. 10A illustrates an example implementation in which common request buffer 1040 and common request queue 1042 are implemented in memory controller 1000

(e.g., in a memory controller die), other implementations may locate components differently in one or more dies.

While FIG. 10B provides an example of how an entry in a common request buffer may be organized, the present technology may be implemented in various ways and is not limited to the fields shown in the examples provided.

A wide variety of host requests may be managed efficiently using a common request buffer (e.g., common request buffer 1040). The following examples illustrate certain operations that may be implemented efficiently using a common request buffer. These examples are provided for illustration and the present technology is not limited to any such examples.

Figures 11A, 11B:
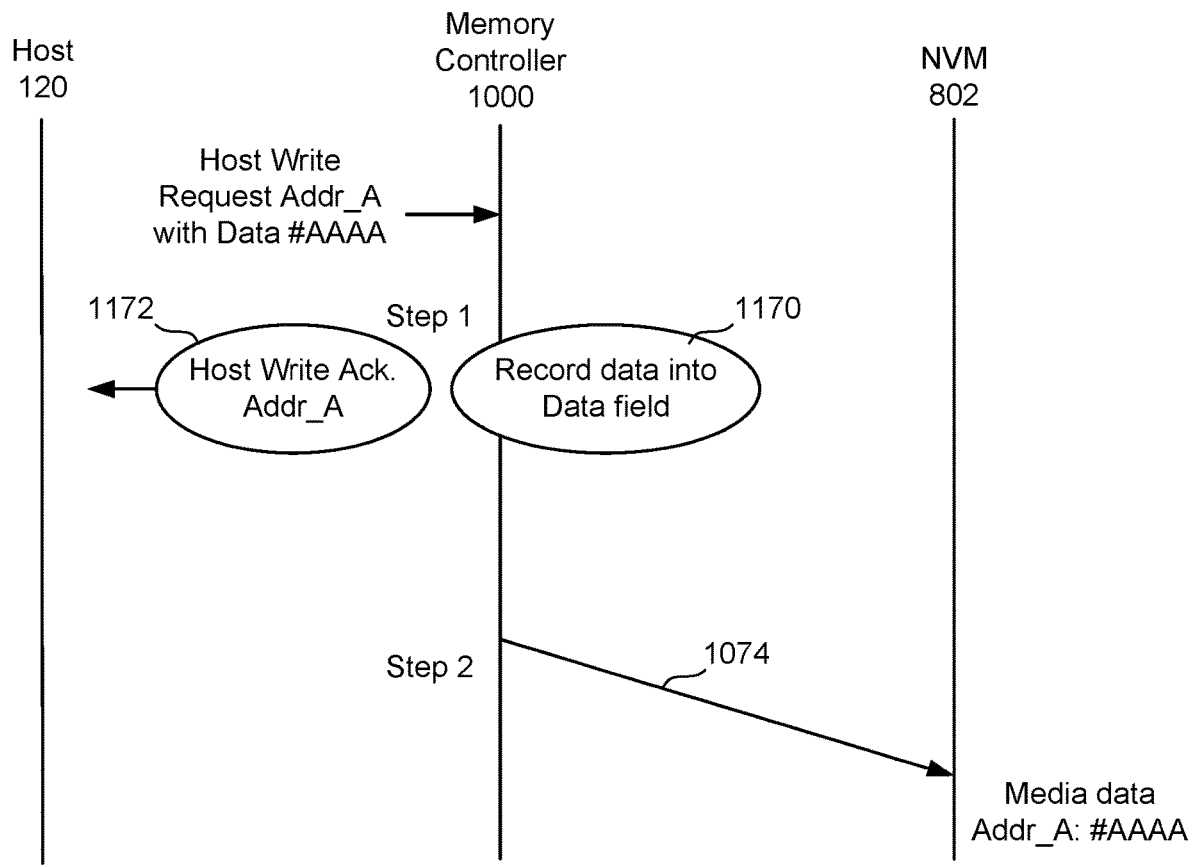
FIGS. 11A-B illustrate an example of a memory controller with a common request buffer handling a host write request.

FIGS. 11A-B shows an example of how memory controller 1000 may handle a host write request to write data #AAAA at address A ("Host Write Request Addr_A with Data #AAAA) including two steps ("Step 1" and "Step 2"). FIG. 11A shows certain communications between memory controller 1000 and non-volatile memory 802 and between memory controller 1000 and host 120 while FIG. 11B shows a corresponding entry in common request buffer 1040 at each step. In Step 1, memory controller 1000 generates an entry in common request buffer corresponding to the host request including placing the address "A" in the Address field 1054 and the data #AAAA in Data field 1056. Memory controller 1000 sends a host write acknowledgement 1172 to the host to indicate that the specified data ( #AAAA) is written at Addr_A ("Host Write Ack Addr_A"). The host considers the data written at this time even though the data may not be stored in non-volatile memory 802 yet (e.g., stored in common request buffer 1040 but not yet in non-volatile memory 802).

FIG. 11B also shows fields 1058, 1060, 1062 and 1064 of the corresponding entry during Step 1, which shows Request Type field 1058 as "Invalid." The host request is considered finished from the host's point of view when acknowledgement 1172 is sent and the request type is marked invalid to allow a subsequent host request to Addr_A (e.g., allow another host request directed to Addr_A to be moved from common request queue 1042). The Data State field 1060 shows "Dirty" indicating that the corresponding Data field 1056 contains data (#AAAA) which has not yet been saved in non-volatile memory 802. The Command field 1062 shows "Write" referring to a write command from memory controller 1000 to non-volatile memory 802 to store the data in the Data field (data "#AAAA") in non-volatile memory 802. The Command State field 1064 shows "Await-Scheduling" indicating that the memory command (write command) is waiting to be sent.

In Step 2, memory controller 1000 sends the memory command 1074 to non-volatile memory 802 and the data is stored at address A ("Media data Addr_A: #AAAA"). Data State field 1060 is updated in Step 2 to show "Clean" indicating that the data in the corresponding Data field is saved in non-volatile memory 802. Command field 1062 and Command State field 1064 are updated to "Invalid" in Step 2 because there is no further memory command after write command 1074.

When Request Type field 1058, Command field 1062 and Command State field 1064 are both "Invalid" at the end of Step 2, the host request and associated memory commands are complete and the entry may be removed from common request buffer 1040 (e.g., if space is needed in common request buffer 1040 for new host requests). An appropriate scheme may be used to efficiently use space in common request buffer 1040 and ensure that space is available for new entries when host requests are received. For example, entries for host requests that are finished may be removed (or overwritten) in order in which the corresponding host requests are finished.

FIGS. 12A-B show an example of a how memory controller 1000 may handle a host read request to read data at address A ("Host Read Request Addr_ A") including two steps ("Step 1" and "Step 2"). FIG. 12A shows certain communications between memory controller 1000 and non-volatile memory 802 and between memory controller 1000 and host 120 while FIG. 12B shows a corresponding entry in common request buffer 1040 at each step. The host read request may be placed in common request queue 1042 and subsequently moved to common request buffer 1040.

In Step 1, memory controller 1000 generates an entry in common request buffer 1040 corresponding to the host request, with the Request Type field 1058 showing "Read." Data State field 1060 and Data field 1056 show "Invalid" because no data is placed in Data field 1056 at this time. Command field 1062 shows "Fast Read" indicating a memory command from memory controller 1000 to non-volatile memory 802 for a fast read of non-volatile memory cells. The Command State field 1064 transitions from "Await-Scheduling" to "In-Process" in Step 1 when the fast read command 1280 is sent to non-volatile memory 802. Address field 1054 shows address "A." Subsequently, the data at Addr_A: #AAAA is read from address A ("Media data Addr_A: #AAAA") and is sent from non-volatile memory 802 to memory controller 1000 in read response 1282.

In Step 2, a host read response 1284 is sent by memory controller 1000 to host 120. The host read response includes data #AAAA that was read from address A. The data may be corrected by ECC engine 812 prior to being sent to the host. The entry in common request buffer 1040 is updated in Step 2 to show "Invalid" for all fields once the memory command and host request are complete. Note that in this example, the read data is not buffered in Data field 1056 of common request buffer 1040 prior to being sent to the host so that Data State field 1060 is "Invalid" and not "Clean." In an alternative, some or all data may be buffered in Data field 1056 and Data State field 1060 may reflect this buffering (e.g., showing "Clean"). For example, if there is another read request for the same data (e.g., host read request for Addr_A) in common request queue 1042, data may be buffered in Data field 1056 and a host read response may be generated using the buffered data, without additionally accessing non-volatile memory 802, which may be faster and may avoid unnecessary reading of non-volatile memory 802.

Figures 13A, 13B:
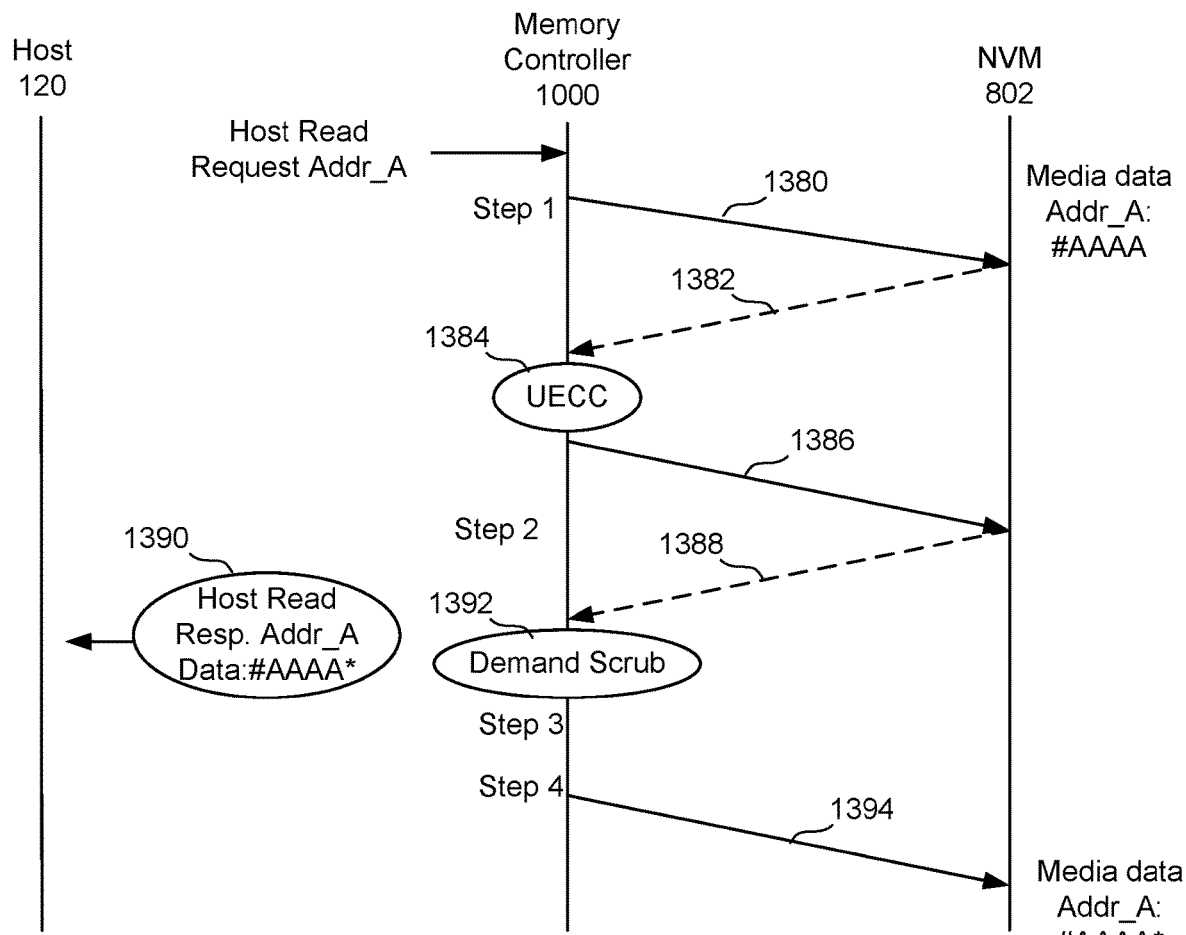
FIGS. 13A-B illustrate an example of a memory controller with a common request buffer handling a host read request for data that is UECC.

FIGS. 13A-B illustrate another example of how memory controller 1000 may handle a host read request to read data at address A ("Host Read Request Addr_A"). This example includes handling data that is UECC and includes four steps ("Step 1" to "Step 4"). FIG. 13A shows certain communications between memory controller 1000 and non-volatile memory 802 and between memory controller 1000 and host 120 while FIG. 13B shows a corresponding entry in common request buffer 1040 at each step. The host read request may be placed in common request queue 1042 and subsequently moved to common request buffer 1040.

In Step 1, memory controller 1000 generates an entry in common request buffer 1040 corresponding to the host read request, with the Request Type field 1058 showing "Read." Data State field 1060 and Data field 1056 show "Invalid" because no data is placed in Data field 1056 at this point. Command field 1062 shows "Fast Read" indicating a memory command from memory controller 1000 to non-volatile memory 802 for a fast read of non-volatile memory cells. The Command State field 1064 transitions from "Await-Scheduling" to "In-Process" in Step 1 when the fast read command 1380 is sent to non-volatile memory 802. Address field 1054 shows address "A." Subsequently, the data read from address A in non-volatile memory 802 is sent in read response 1382 from non-volatile memory 802 to memory controller 1000. ECC engine 812 may decode the data to attempt to correct errors. In the example of FIG. 13A, memory controller 1000 determines that the data is UECC 1384.

In response to determining that the data read at Step 1 is UECC, memory controller 1000 generates and sends an extended read command 1386 and updates the memory command field as shown by "Extended Read" in Command field 1062 of Step 2. This is an example of generating a memory command and updating the memory command field in response to results of accessing the corresponding address (UECC data in this example). An extended read operation may provide a copy of the data with a lower BER than that provided by a fast read. The non-volatile memory 802 sends the results from the extended read to memory controller 1000 in read response 1388. ECC engine 812 successfully decodes the data to produce a corrected version of data #AAAA (indicated as "#AAAA*"). The corrected data is sent to host 120 in a host read response 1390 ("Host Read Resp. Addr_A Data: #AAAA*").

Because the data at address A is UECC when read using a fast read, memory controller 1000 initiates a Demand Scrub 1392, which includes writing the corrected data back to non-volatile memory 802 (e.g., replacing data at address A with the corrected data #AAAA* obtained from ECC decoding) so that subsequent fast reads may obtain data that is correctable.

In Step 3, Request Type field 1058 shows "Invalid" because the host read response 1390 has been sent and the host considers the read operation complete. Data State field 1060 shows "Dirty" to reflect that corrected data #AAAA* is stored in Data field 1056. Command field 1062 shows "Write" corresponding to a memory command to write the corrected data back to address A and the Command State field 1064 shows "Await-Scheduling." Because Request Type field 1058 shows "Invalid" at this time, another host request directed to Addr_A may be taken from common request queue 1042 to generate a corresponding entry in common request buffer 1040. When the Request Type field 1058 shows "Read" and not "Invalid" (e.g., in Step 1 and Step 2) any new host requests directed to Addr_A are maintained in common request queue 1042 and are blocked from being moved to common request buffer 1040. This may avoid conflicting host requests (e.g., as illustrated in FIG. 8B).

In Step 4, a memory write command 1394 is sent to non-volatile memory 802 with the corrected data #AAAA*, which is stored at address A ("Media data Addr_A: #AAAA*"). The Data State field 1060 is updated to "Clean" indicating that the data #AAAA* in Data field 1056 is saved in non-volatile memory 802. Command field 1062 and Command State field 1064 are updated to "Invalid" because there are no further memory commands. The entry may be removed or overwritten after Step 4.

Figures 14A, 14B:
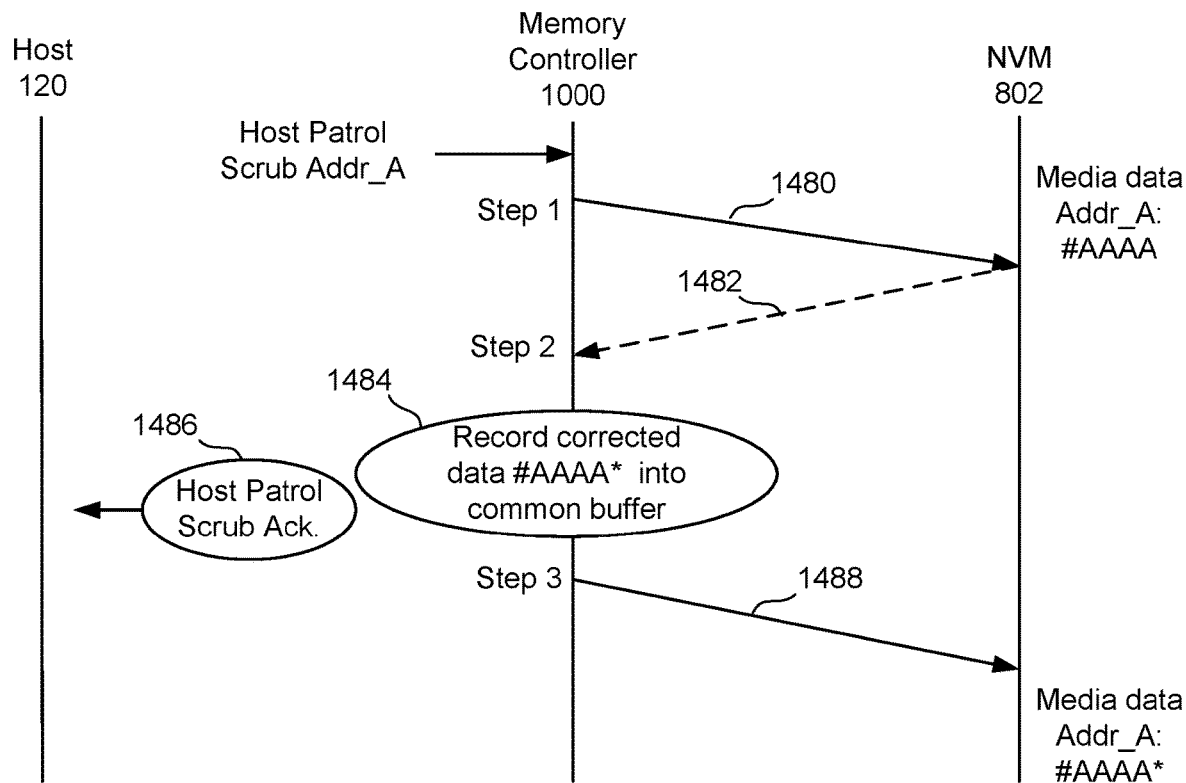
FIGS. 14A-B illustrate an example of a memory controller with a common request buffer handling a host patrol scrub request.

FIGS. 14A-B illustrate an example of how memory controller 1000 may handle a host refresh request or "patrol scrub" request (e.g., a media management request to read data from an address, correct the data and write the corrected data back to the same address). FIG. 14A shows certain communications between memory controller 1000 and non-volatile memory 802 and between memory controller 1000 and host 120 while FIG. 14B shows a corresponding entry in common request buffer 1040 at each step.

Memory controller 1000 receives a patrol scrub request that identifies address A as the target ("Patrol Scrub Addr_A"). The request is placed in common request queue 1042 and subsequently moved to common request buffer 1040. Memory controller 1000 generates a corresponding entry in common request buffer 1040 as shown in Step 1, with Request type field 1058 showing "Refresh." Command field 1062 shows "Fast Read" with Command State field 1064 showing "Await-Scheduling —>In Process" as a corresponding memory command 1480 is scheduled and sent to non-volatile memory 802. Address field 1054 shows address "A" while Data State field 1060 and Data field 1056 show "Invalid." In response to memory command 1480, non-volatile memory 802 reads data #AAAA from address A and sends a read response 1482 with data #AAAA to memory controller 1000.

In Step 2, corrected data #AAAA* (e.g., corrected by ECC engine 812) is recorded into common request buffer 1484 (e.g., into Data field 1056 as shown in FIG. 4B). Data State field 1060 is updated to show "Dirty" which indicates that corrected data #AAAA* has not yet been stored in non-volatile memory 802. A host patrol scrub acknowledgement 1486 ("Host Patrol Scrub Ack.") is sent from memory controller 1000 to host 120 to indicate that the requested patrol scrub has been performed. Request Type field 1058 is updated to show "Invalid" accordingly. Command field 1062 is updated to show "Write" indicating a memory command to write the corrected data #AAAA* in Data field 1056 and Command State field 1064 is updated to "Await-Scheduling."

In Step 3, a memory write command 1488 is sent from memory controller 1000 to non-volatile memory 802 causing the corrected data #AAAA* to be written at address A. When the corrected data #AAAA* is stored in non-volatile memory 802, Data State field 1060 is updated to read "Clean" and Command field 1062 and Command State field 1064 are updated to read "Invalid."

FIGS. 15A-B illustrate an example of how memory controller 1000 may handle a host wear leveling request (e.g., a Wear Level Move or "WLM" request to move data from a source location to a destination location in non-volatile memory 802). FIG. 15A shows certain communications between memory controller 1000 and non-volatile memory 802 and between memory controller 1000 and host 120 while FIG. 15B shows a corresponding entry in common request buffer 1040 at each step.

The request to move data from address A to B is placed in common request queue 1042 and subsequently moved to common request buffer 1040. Memory controller 1000 generates two corresponding entries in common request buffer 1040 as shown in Steps 1-3, one entry labeled "Addr_A" for the source address and one entry labeled "Addr_B" for the destination address.

In Step 1, in the entry for the source (Addr_A) the Request type field 1058 shows "WLM," Command field 1062 shows "Fast Read" with Command State field 1064 showing "Await-Scheduling→In Process" as a corresponding memory command 1580 is scheduled and sent to non-volatile memory 802. Address field 1054 shows address "A" while Data State field 1060 and Data field 1056 are "Invalid". In response to memory command 1580, non-volatile memory 802 reads data #AAAA from address A and sends a read response 1582 with data #AAAA to memory controller 1000. The entry for the destination (Addr_B)

shows Request Type field 1058, Command field 1062, Command State field 1064 and Data field 1056 as "Invalid" and shows Data State field 1060 as "Waiting for Data."

In Step 2, the fast read of address A is finished and the entry for Addr_A is updated to show Request type field 1058, Data State field 1060, Command field 1062 and Command State field 1064 as "Invalid" (the entry may be deleted or overwritten at this time). The data read from address A ( #AAAA) may be corrected (e.g., by ECC engine 812) and the corrected data ( #AAAA*) is recorded into Data field 1056 of Addr_B entry of the common request buffer 1584. Accordingly, FIG. 15B shows corrected data #AAAA* in Data field 1056 and Data State field 1060 as "Dirty." A host wear leveling acknowledgement 1586 is sent to host 120 ("Host Wear Leveling Ack."). In the entry for Addr_B, the Command field 1062 shows "Write" indicating a write command to write the corrected data #AAAA* at address B and the Command State field 1064 shows "Await-Scheduling."

In Step 3, the write command 1588 to write the corrected data #AAAA* at address B is sent to non-volatile memory 802. The entry for Addr_A remains unchanged from Step 2. The entry for Addr_B shows Data State field 1060 updated from "Dirty" to "Clean" to indicate that corrected data #AAAA* is saved in non-volatile memory 802. Command field 1062 and Command State field 1064 are updated to "Invalid." Both entries may be deleted or overwritten at this time.

A dedicated command state field (e.g., Command State field 1064) in each common request buffer entry may be updated according to corresponding state transitions (e.g., as shown in examples above including the examples of FIGS. 13A-15B). This may facilitate complex and in-place media management within each common request buffer entry.

Figure 16:
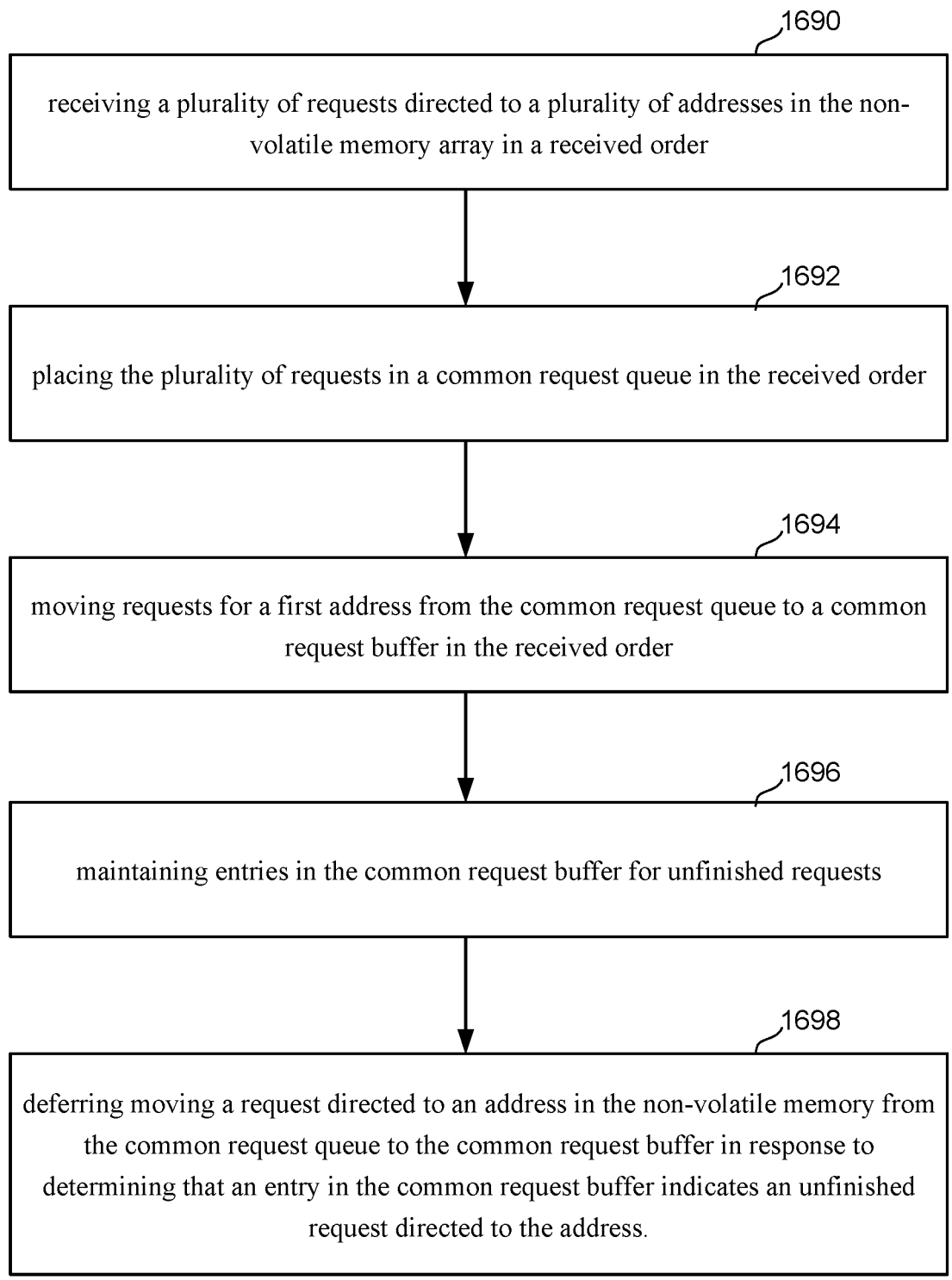
FIG. 16 illustrates an example of a method of managing requests using a common request buffer.

FIG. 16 illustrates a method of managing requests from a host/MML to a memory controller that is coupled to a non-volatile memory array (e.g., from host 120 to memory controller 1000 coupled to non-volatile memory 802 as described above). The method includes receiving a plurality of host requests directed to a plurality of addresses in the non-volatile memory array in a received order 1690, placing the plurality of host requests in a common request queue," (e.g., common request queue 1042) in the received order 1692 and moving host requests for a first address from the common request queue to a common request buffer (e.g., common request buffer 1040) in the received order 1694. The method further includes maintaining entries in the common request buffer for unfinished requests 1696, and deferring moving a request directed to an address in the non-volatile memory from the common request queue to the common request buffer in response to determining that an entry in the common request buffer indicates an unfinished request directed to the address 1698. Deferring moving host requests in this way may ensure that only one unfinished host request is present in a common request buffer for any given address in the non-volatile memory, which may avoid problems associated with multiple ongoing requests to the same address (e.g., as illustrated in FIGS. 8A-B), repeated read requests to the same address (e.g., as illustrated in FIGS. 9A-B) and/or other problems.

The method may further include, in response to determining that a new host request in the common request queue is directed to a first address, searching entries in the common request buffer for the first address and in response to finding the first address in a first entry in the common request buffer, the first entry for a prior host request that is directed to the first address, holding the new host request in the common request queue until the prior host request is finished (e.g., blocking the new host request from being moved to the common request buffer until the prior host request is finished). Maintaining entries in the common request buffer for unfinished host requests may include, for each entry, maintaining fields including address, data, host request type, data state, memory command and memory command state (e.g., as illustrated in FIG. 10B.

The method of FIG. 16 may be implemented with any components illustrated above (e.g., common request buffer 1040 and/or common request queue 1042) or otherwise and control circuits used to implement the method may be located on one or more dies as described above or otherwise. Common request buffer 1040 may be considered a request buffering means for receiving host requests from a common request queue in the received order, buffering unfinished host requests directed to a plurality of memory addresses such that each address in the non-volatile memory array has no more than one entry in the request buffer, the request buffering means connected between the common request queue and the non-volatile memory array.

An embodiment includes a control circuit configured to communicate with a non-volatile memory array that stores data at a plurality of addresses. The control circuit may include an interface configured to receive host requests from a host; a First-In First-Out buffer (common request queue) connected to the interface, the common request queue configured to receive the host requests from the interface in a received order, store the host requests and output the host requests in the received order; and a common request buffer connected to the common request queue, the common request buffer configured to receive the host requests from the common request queue in the received order, buffer unfinished host requests directed to the plurality of addresses such that for any address in the non-volatile memory array no more than one unfinished host request is in the common request buffer.

The non-volatile memory array may be one of Magnetoresistive Random Access Memory (MRAM), Phase Change Memory (PCM) or Resistive Random Access Memory (ReRAM). The common request buffer may be configured to store a first host request directed to a first address until the first host request is finished and to receive and store a second host request directed to the first address only after the first host request is finished. An entry in the common request buffer may include a request type field that indicates a type of host request received and an address field that indicates a corresponding address in the non-volatile memory array. The entry may further include a data field for data associated with the corresponding host request and a data state field that indicates a state of the data field. The entry may further include a memory command field configured to hold an indicator of a memory command associated with the corresponding host request and a command state field configured to hold a state indicator associated with the memory command. The host requests may include one or more refresh requests that each specify a corresponding address in the non-volatile memory array where host data is stored, the refresh request indicating that the host data is to be rewritten at the corresponding address. The host requests may include Wear Level Move (WLM) requests, each WLM request specifying a source address in the non-volatile memory array from which host data is to be read and a destination address in the non-volatile memory array where the host data is to be written. The control circuit may further include an Error Correction Code (ECC) circuit connected to the common request buffer, the ECC circuit configured to correct data in the common request buffer. An entry in the common request buffer may include fields for address, data, host request type, data state, memory command and memory command state.

An embodiment includes a method of managing host requests from a host to a memory controller that is coupled to a non-volatile memory array. The method may include receiving a plurality of host requests directed to a plurality of addresses in the non-volatile memory array in a received order; placing the plurality of host requests in a First-In First-Out buffer (common request queue) in the received order; moving host requests from the common request queue to a common request buffer in the received order; maintaining entries in the common request buffer for unfinished host requests; and deferring moving a host request directed to an address in the non-volatile memory array from the common request queue to the common request buffer in response to determining that an entry in the common request buffer indicates an unfinished host request directed to the address.

The non-volatile memory array may be one of Magnetoresistive Random Access Memory (MRAM), Phase Change Memory (PCM) or Resistive Random Access Memory (ReRAM). The method may include, in response to determining that a new host request in the common request queue is directed to a first address, searching entries in the common request buffer for the first address; and in response to finding the first address in a first entry in the common request buffer, the first entry for a prior host request that is directed to the first address, holding the new host request in the common request queue until the prior host request is finished. Maintaining entries in the common request buffer for unfinished host requests may include, for each entry, maintaining fields including a host request type field for a corresponding unfinished host request and an address field for a corresponding address in the non-volatile memory array. Maintaining entries in the common request buffer for unfinished host requests may include, for each entry, maintaining fields including a data field for data associated with the corresponding host request and a data state field that indicates a state of the data field of the entry. Maintaining entries in the common request buffer for unfinished host requests may include, for each entry, maintaining fields including a memory command field configured to hold an indicator of a memory command associated with the corresponding host request and a command state field configured to hold a state indicator associated with the memory command. The method may further include, in response to moving a first host request directed to a first address from the common request queue to the common request buffer, executing one or more memory commands directed to the first address and updating an entry in the common request buffer associated with the first host request.

An embodiment includes a memory system that includes a non-volatile memory array formed of one of Magnetoresistive Random Access Memory (MRAM), Phase Change Memory (PCM) or Resistive Random Access Memory (ReRAM); an interface configured to receive host requests that are directed to addresses in the non-volatile memory array; a First-In First-Out buffer (common request queue) connected to the interface, the common request queue configured to receive the host requests from the interface in a received order, store the host requests and output the host requests in the received order; and a request buffering means for receiving the host requests from the common request queue in the received order, buffering unfinished host requests such that each address in the non-volatile memory array has no more than one entry in the request buffering means, the request buffering means connected between the common request queue and the non-volatile memory array.

The memory system may further include an Error Correction Code (ECC) circuit connected to the interface and connected to the request buffering means, the ECC circuit configured to correct data in the request buffering means. Each entry in the request buffering means may specify an address in the non-volatile memory array, data, a host request type, a data state, a memory command type and a memory command state.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the terms "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation. Also, as used herein, the terms "substantially" and/or "about" mean that the specified dimension or parameter may be varied within an acceptable tolerance for a given application.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A control circuit configured to communicate with a non-volatile memory array that stores data at a plurality of addresses, the control circuit comprising:
   an interface configured to receive requests;
   a common request queue connected to the interface, the common request queue configured to receive the requests from the interface in a received order, store the requests and output the requests for a first address in the received order for the first address; and
   a common request buffer connected to the common request queue, the common request buffer configured to receive the requests for the first address from the common request queue in the received order, buffer unfinished requests directed to the plurality of addresses in corresponding entries such that for each unfinished request a corresponding entry in the common request buffer includes an address to which the unfinished request is directed and a request type from a plurality of types including at least read and write, the common request buffer configured to block receipt of requests from the common request queue according to addresses in entries in the common request buffer such that for any specified address in the non-volatile memory array no more than one unfinished request is in the common request buffer and additional requests to the specified address are blocked so that they remain in the common request queue.

2. The control circuit of claim 1, wherein the non-volatile memory array is one of Magnetoresistive Random Access Memory (MRAM), Phase Change Memory (PCM) or Resistive Random Access Memory (ReRAM).

3. The control circuit of claim 1, wherein the common request buffer is configured to store a first request directed to the first address until the first request is finished and to receive and store a second request directed to the first address only after the first request is finished.

4. The control circuit of claim 1, wherein the control circuit is further configured to remove entries from the common request buffer in response to a determination that a corresponding request is finished.

5. The control circuit of claim 1, wherein the corresponding entry further includes a data field for data associated with the corresponding request and a data state field that indicates a state of the data field.

6. The control circuit of claim 5, wherein the corresponding entry further includes a memory command field configured to hold an indicator of a memory command associated with the corresponding request and a command state field configured to hold a state indicator associated with the memory command.

7. The control circuit of claim 1, wherein the requests further include media management requests including at least Wear Level Move (WLM) requests and refresh requests, each WLM request specifying a source address in the non-volatile memory array from which host data is to be read and a destination address in the non-volatile memory array where the host data is to be written, each refresh request specifying a corresponding address in the non-volatile memory array where host data is stored, the refresh request indicating that the host data is to be rewritten at the corresponding address.

8. The control circuit of claim 1, further comprising an Error Correction Code (ECC) circuit connected to the common request buffer, the ECC circuit configured to correct data in the common request buffer.

9. The control circuit of claim 1, wherein an entry in the common request buffer includes fields for address, data, request type, data state, memory command and memory command state.

10. A method of managing requests from a host to a memory controller that is coupled to a non-volatile memory array, the method comprising:
receiving a plurality of requests directed to a plurality of addresses in the non-volatile memory array in a received order;
placing the plurality of requests in a common request queue in the received order;
moving requests for a first address from the common request queue to a common request buffer in the received order;
maintaining entries in the common request buffer for unfinished requests, each entry including an address to which the unfinished request is directed and a request type;
deferring moving a new request directed to an address in the non-volatile memory array from the common request queue to the common request buffer in response to determining that a prior entry in the common request buffer indicates that a prior request directed to the address is unfinished; and
subsequently, deleting the prior entry in response to a determination that the prior request is finished.

11. The method of claim 10, wherein the non-volatile memory array is one of Magnetoresistive Random Access Memory (MRAM), Phase Change Memory (PCM) or Resistive Random Access Memory (ReRAM).

12. The method of claim 10, further comprising:
in response to determining that the new request in the common request queue is directed to the first address, searching entries in the common request buffer for the first address; and
in response to finding the first address in the prior entry in the common request buffer, the prior entry for the prior request that is directed to the first address, holding the new request in the common request queue until the prior request is finished.

13. The method of claim 10, wherein maintaining entries in the common request buffer for unfinished requests includes, for each entry, maintaining fields including a request type field for a corresponding unfinished request and an address field for a corresponding address in the non-volatile memory array.

14. The method of claim 13, wherein maintaining entries in the common request buffer for unfinished requests includes, for each entry, maintaining fields including a data field for data associated with the corresponding request, a data state field that indicates a state of the data field of the entry, a memory command field configured to hold an indicator of a memory command associated with the corresponding request and a command state field configured to hold a state indicator associated with the memory command.

15. The method of claim 14, further comprising updating the memory command field in response to results of accessing the corresponding address.

16. The method of claim 10, further comprising:
in response to moving a first request directed to a first address from the common request queue to the common request buffer, executing one or more memory commands directed to the first address and updating an entry in the common request buffer associated with the first request.

17. A memory system comprising:
a non-volatile memory array formed of one of Magnetoresistive Random Access Memory (MRAM), Phase Change Memory (PCM) or Resistive Random Access Memory (ReRAM);
an interface configured to receive requests that are directed to addresses in the non-volatile memory array;
a common request queue connected to the interface, the common request queue configured to receive the requests from the interface in a received order, store the requests and output the requests for a first address in the received order; and a request buffering means for receiving the requests from the common request queue in the received order, buffering unfinished requests in corresponding entries such that for each unfinished request a corresponding entry includes an address to which the unfinished request is directed and a request type from a plurality of types and blocking receipt of requests from the common request queue according to addresses such that each address in the non-volatile memory array has no more than one entry in the request buffering means, the request buffering means connected between the common request queue and the non-volatile memory array.

18. The memory system of claim 17, further comprising an Error Correction Code (ECC) circuit connected to the interface and connected to the request buffering means, the ECC circuit configured to correct data in the request buffering means.

19. The memory system of claim 17, wherein each entry in the request buffering means specifies an address in the non-volatile memory array, data, a request type, a data state, a memory command type and a memory command state.

* * * * *